(12) United States Patent
Kumata et al.

(10) Patent No.: US 7,295,229 B2
(45) Date of Patent: Nov. 13, 2007

(54) SURROUND SURVEILLANCE APPARATUS FOR MOBILE BODY

(75) Inventors: Kiyoshi Kumata, Kyoto (JP); Noritoshi Kako, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 569 days.

(21) Appl. No.: 09/975,678

(22) Filed: Oct. 11, 2001

(65) Prior Publication Data

US 2002/0080017 A1    Jun. 27, 2002

(30) Foreign Application Priority Data

Oct. 11, 2000   (JP)   ............... 2000-311206
Oct. 9, 2001    (JP)   ............... 2001-310887

(51) Int. Cl.
*H04N 7/18*   (2006.01)

(52) U.S. Cl. ............... 348/148; 348/36; 348/39

(58) Field of Classification Search ............... 219/203; 340/435, 436, 438, 903, 937, 995.13; 348/142–170, 348/36–39; 382/103, 102; 701/213; 73/29.01; *H04N 7/18*

See application file for complete search history.

(56) References Cited

U.S. PATENT DOCUMENTS

| | | | | | |
|---|---|---|---|---|---|
| 4,420,238 | A | * | 12/1983 | Felix | 348/151 |
| 4,772,942 | A | * | 9/1988 | Tuck | 348/148 |
| 5,937,079 | A | * | 8/1999 | Franke | 382/103 |
| 6,259,359 | B1 | * | 7/2001 | Fujinami et al. | 340/435 |
| 6,314,364 | B1 | * | 11/2001 | Nakamura | 340/995.13 |
| 6,422,062 | B1 | * | 7/2002 | King et al. | 73/29.01 |
| 6,424,273 | B1 | * | 7/2002 | Gutta et al. | 340/903 |
| 6,521,868 | B1 | * | 2/2003 | Kyrtsos et al. | 219/203 |
| 6,704,048 | B1 | * | 3/2004 | Malkin et al. | 348/169 |
| 6,891,563 | B2 | * | 5/2005 | Schofield et al. | 348/148 |
| 2003/0025793 | A1 | * | 2/2003 | McMahon | 348/148 |
| 2004/0085447 | A1 | * | 5/2004 | Katta et al. | 348/143 |
| 2004/0148102 | A1 | * | 7/2004 | McCarthy et al. | 701/213 |

FOREIGN PATENT DOCUMENTS

| | | |
|---|---|---|
| DE | 195 46 391 A1 | 6/1996 |
| DE | 196 36 028 C1 | 11/1997 |
| DE | 100 17 072 A1 | 10/2000 |
| EP | 1 158 473 A2 | 11/2001 |
| JP | 06-295333 | 10/1994 |
| JP | 09-118178 | 5/1997 |
| JP | 2000-128031 | 5/2000 |

* cited by examiner

*Primary Examiner*—Anand Rao
(74) *Attorney, Agent, or Firm*—Edwards Angell Palmer + Dodge LLP; David G. Conlin; Scott B. Weston

(57) ABSTRACT

A surround surveillance system mounted on a mobile body for surveying surroundings around the mobile body includes an omniazimuth visual system, the omniazimuth visual system includes at least one omniazimuth visual sensor including an optical system capable of obtaining an image with an omniazimuth view field area therearound and capable of central projection transformation of the image into an optical image, and an imaging section including an imaging lens for converting the optical image obtained by the optical system into image data, an image processor for transforming the image data into at least one of panoramic image data and perspective image data, a display section for displaying one of a panoramic image corresponding to the panoramic image data and a perspective image corresponding to the perspective image data and a display control section for controlling the display section.

19 Claims, 14 Drawing Sheets

Hyperboloidal mirror optical system $$\frac{X^2+Y^2}{a^2}-\frac{Z^2}{b^2}=-1$$

$$c^2=a^2+b^2$$

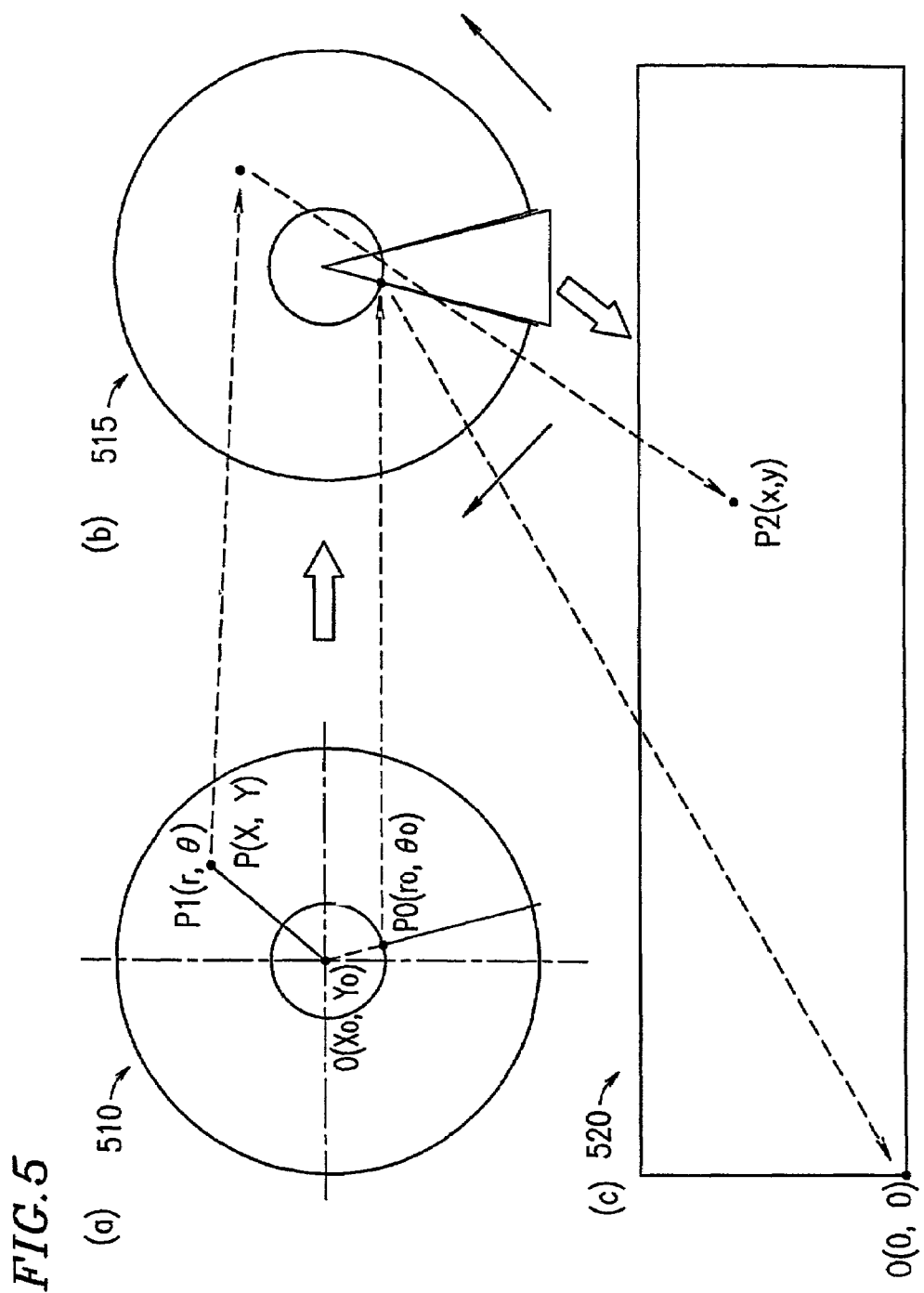

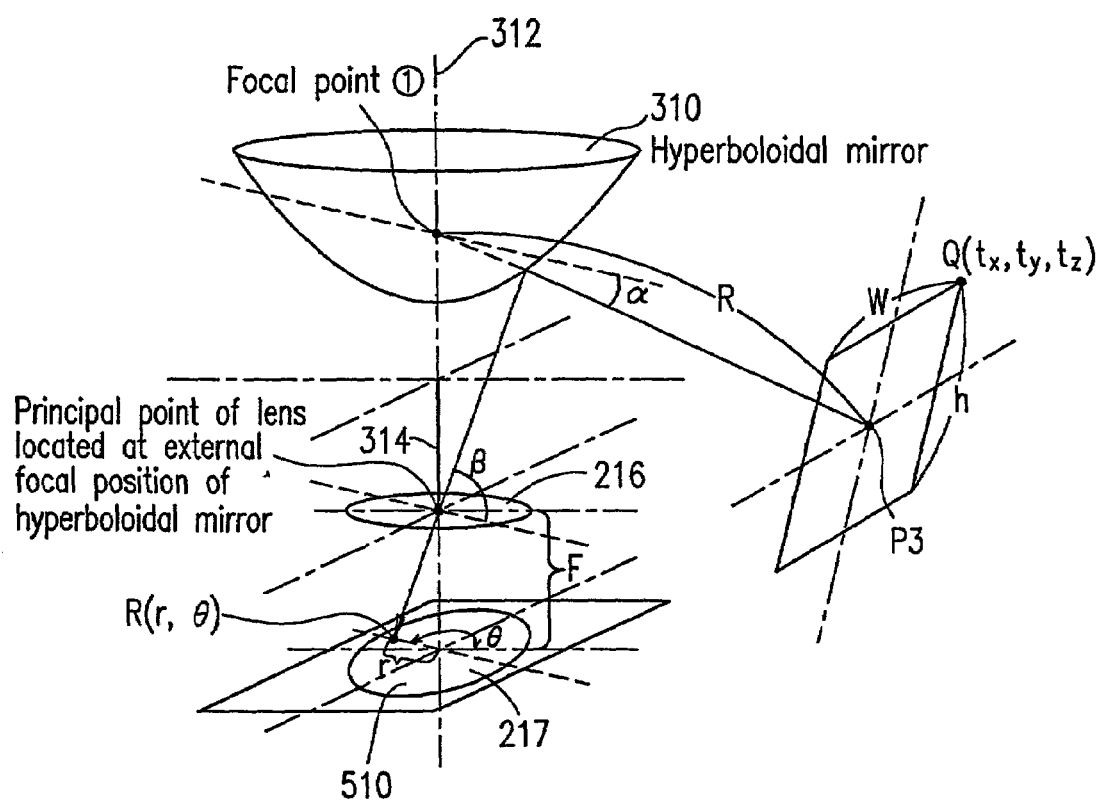
FIG. 6   Perspective transformation

SURROUND SURVEILLANCE APPARATUS FOR MOBILE BODY

BACKGROUND OF THE INVENTION

1. Field of the Invention

The present invention relates to a surround surveillance system for surveying surroundings of a mobile body. Specifically, the present invention relates to a surround surveillance apparatus for surveying surroundings of a mobile body for human and cargo transportation, such as a car, a train, etc.

2. Description of the Related Art

In recent years, an increase in traffic accidents has become a major social problem. In particular, in a place where a plurality of roads meet (T-intersection, crossroad, or the like), various accidents may sometimes occur. For example, people rush out into the street in which cars are travelling, a car collides head-on or into the rear of another car, etc. It is believed, in general, that such accidents are caused because a field of view for both drivers and pedestrians is limited in the crossroad area, and many of the drivers and pedestrians do not pay attention to their surroundings and cannot quickly recognize dangers. Thus, improvements in a car itself, arousal of attention of drivers, improvements and maintenance of traffic environments, etc., are highly demanded.

Conventionally, for the purpose of improving traffic environments, mirrors are installed at appropriate positions in a crossroad area such that drivers and pedestrians can see blind areas behind obstacles. However, the viewing range of a blind area which can be covered by a mirror is limited and, furthermore, a sufficient number of mirrors have not been installed.

In recent years, many large motor vehicles, such as buses and some passenger cars, have a surveillance system for checking the safety therearound, especially at a rear side of the vehicle. The system includes a surveillance camera installed in the rear of the vehicle, and a monitor provided near a driver's seat or on a dashboard. The monitor is connected to the surveillance camera via a cable. An image obtained by the surveillance camera is displayed on the monitor. However, even with such a surveillance system, the driver must check the safety of both sides of the vehicle manually using eyesight. Accordingly, in a crossroad area or the like, in which there are blind areas due to obstacles, the driver sometimes cannot quickly recognize dangers. Furthermore, a single camera of this type has a limited field of vision such that the camera can detect obstacles and anticipate collisions only in one direction. In order to check the presence/absence of obstacles and anticipate the danger of collision over a wide range, a certain manipulation, e.g., alteration of a camera angle, is required.

Since a primary purpose of the conventional surround surveillance system for motor vehicles is surveillance in one direction, a plurality of cameras are required for watching a 360° area around a motor vehicle; i.e., it is necessary to provide four or more cameras such that each of front, rear, left, and right sides of the vehicle is provided with at least one camera.

Furthermore, in the case where a vehicle is used in an area where or at a time when the environmental temperature is decreased to or below a certain temperature, such as areas of high altitude, areas of high latitude regions, during winter, etc., during a certain period after an engine of the vehicle is started, dew may sometimes be formed on a window glass of the vehicle, and subsequently frozen on the window. Such dew or frozen dew, or any other factor, may sometimes fog the window, causing difficulty for a driver to look outside from the inside of the vehicle. For example, when the driver parks the vehicle at the edge of a road, in many cases, the driver's vehicle is close to another vehicle or a person. When the driver starts to drive the vehicle under such circumstances, the driver of the vehicle cannot fully grasp the conditions around the vehicle unless the fog on the window of the glass is sufficiently wiped away or evaporated by warm air.

As a matter of course, in the case of using a motor vehicle, a driver encounters various situations where he/she is required to secure the safety around the motor vehicle. For example, when the driver starts to drive, the driver has to check the safety at the right, left, and rear sides of the motor vehicle, as well as the front side. Naturally, when the motor vehicle turns right or left, or when the driver parks the motor vehicle in a carport or drives the vehicle out of the carport, the driver has to check the safety around the motor vehicle. However, due to the shape and structure of the vehicle, there are blind spots/areas, i.e., areas that the driver cannot see directly behind and/or around the vehicle, and it is difficult for the driver to check the safety in such blind spots/areas. As a result, such blind areas impose a considerable burden on the driver.

Furthermore, in the case of using a conventional surround surveillance system, it is necessary to provide a plurality of cameras for checking the safety in a 360° area around the vehicle. In such a case, the driver has to selectively switch the cameras from one to another, and/or turn the direction of the selected camera according to circumstances, in order to check the safety around the vehicle. Such a manipulation is a considerable burden for the driver.

Furthermore, in the case where a window glass of a vehicle is fogged and it is difficult for a driver of the vehicle to see outside from the inside of the vehicle, the driver needs to increase the temperature inside the vehicle and wait until the fog on the window is cleared, or needs to wipe away the fog on the window so that the driver can check the safety around the vehicle manually using eyesight. In such a case, if there is means for helping the driver to check the safety around the vehicle instead of manually using eyesight, the driver can start the vehicle in a more secure manner.

SUMMARY OF THE INVENTION

According to one aspect of the present invention, a surround surveillance system mounted on a mobile body for surveying surroundings around the mobile body includes an omniazimuth visual system, the omniazimuth visual system includes at least one omniazimuth visual sensor including an optical system capable of obtaining an image with an omniazimuth view field area therearound and capable of central projection transformation of the image into an optical image, and an imaging section including an imaging lens for converting the optical image obtained by the optical system into image data, an image processor for transforming the image data into at least one of panoramic image data and perspective image data, a display section for displaying one of a panoramic image corresponding to the panoramic image data and a perspective image corresponding to the perspective image data and a display control section for controlling the display section. The optical system includes a hyperboloidal mirror which has a shape of one sheet of a two-sheeted hyperboloid, an optical axis of the hyperboloidal mirror being identical with an optical axis of the imaging lens, and the principal point of the imaging lens being located at one of focal points of the hyperboloidal mirror. The display section displays the perspective image transformed from the bird's-eye image of the mobile body and surroundings thereof.

In one embodiment of this invention, the at least one omniazimuth visual sensor is located such that a bird's-eye image of the entire mobile body and surroundings thereof is transformed into the image data.

In one embodiment of this invention, the display section simultaneously or selectively displays the panoramic image and the perspective image.

In one embodiment of this invention, the display section displays an image seen in a direction opposite to a most likely moving direction of the mobile body.

In one embodiment of this invention, the image processor transforms image data corresponding to a first area within the omniazimuth view field area around the optical system into first perspective image data.

In one embodiment of this invention, in response to control by the display control section, the image processor transforms image data corresponding to a second area within the omniazimuth view field area around the optical system which does not overlap with the first area into a second perspective image data which does not coincide with the first perspective image data.

In one embodiment of this invention, the second area is identical to an area which is obtained by performing at least one of translational transfer processing and zoom-in/zoom-out processing on the first area.

In one embodiment of this invention, the optical system is positioned such that an optical axis of the optical system is perpendicular to a most likely moving direction of the mobile body.

In one embodiment of this invention, in response to control by the display control section, the display section displays an image showing the mobile body on a display screen of the display section such that the mobile body is shown at a predetermined position on a displayed image on the display screen.

When displaying a bird's-eye perspective image of a mobile body and surroundings thereof, the display section preferably displays the image such that the mobile body is shown at a predetermined position on a display screen.

According to the present invention, the display section displays a bird's-eye perspective image of a mobile body and surroundings thereof. In this case, when the display section displays a bird's-eye perspective image of the entire mobile body and surroundings thereof, an operator of the mobile body can check the surroundings of the mobile body in all directions at one time.

When an omniazimuth visual sensor can directly convert a bird's-eye image of an entire mobile body and surroundings thereof to image data, the display section can display a bird's-eye perspective image of the entire mobile body and surroundings thereof which is converted from the image data derived from the omniazimuth visual sensor.

However, in some cases, an omniazimuth visual sensor cannot directly convert a bird's-eye image of an entire mobile body and surroundings thereof to image data. For example, when an omniazimuth visual sensor is positioned at a place higher than the main body (or roof) of a vehicle, the omniazimuth visual sensor can obtain a bird's-eye image of the entire vehicle and surroundings thereof which is directly seen from a position right above the vehicle. However, when the omniazimuth visual sensor is positioned at a place lower than the roof of a vehicle, a portion of the view field of the omniazimuth visual sensor is interrupted by the vehicle so that a bird's-eye image of the entire vehicle and surroundings thereof cannot be obtained.

In such a case, a plurality of perspective images obtained through a plurality of omniazimuth visual sensors may be combined to display a single bird's-eye perspective image of the entire vehicle and surroundings thereof. With such an arrangement, an operator of the mobile body can check the surroundings of the mobile body in all directions at one time.

Alternatively, vehicle image data which represents a top view image (bird's-eye image) of the vehicle which was previously captured from a position directly above the vehicle is stored in a storage section of an image processor, and the vehicle image data stored in the storage section is combined with a perspective image data obtained by converting the image obtained through the omniazimuth visual sensor, whereby the display section may display a perspective image showing the entire vehicle on a predetermined position on the display screen.

Alternatively, image data of a top view image (bird's-eye image) of the vehicle which was previously created by using computer graphics software may be stored in a storage section of an image processor, and the previously created image data may be combined with perspective image data obtained by converting an image derived from the omniazimuth visual sensor, whereby the display section may display a combined image showing the entire vehicle on a predetermined position on the display screen.

In this way, a prepared image of a mobile body and a perspective image showing the mobile body and its surroundings which is obtained through an omniazimuth visual sensor are combined into an image to be displayed. From such a combined image, the operator of the mobile body can readily grasp a relative distance between the mobile body and objects around the vehicle. By using a previously captured image of the mobile body, the operator of the mobile body can readily grasp a relative distance between the mobile body and objects around the vehicle with more visual reality.

In one embodiment of this invention, the display section simultaneously displays an image seen in a direction opposite to a most likely moving direction of the mobile body and an image seen in a direction which is not identical or opposite to the most likely moving direction of the mobile body.

In one embodiment of this invention, the mobile body is a vehicle.

In one embodiment of this invention, the vehicle includes a first bumper provided at a most likely moving direction side of the vehicle and a second bumper provided at a side of or the vehicle opposite to the most likely moving direction side. The at least one omniazimuth visual sensor includes a first omniazimuth visual sensor placed on the first bumper and a second omniazimuth visual sensor placed on the second bumper.

In one embodiment of this invention, the first omniazimuth visual sensor is placed on one of a right end and a left end of the first bumper with respect to the most likely moving direction of the vehicle. The second omniazimuth visual sensor is placed on one end of the second bumper which is diagonal to the end of the first bumper where the first omniazimuth visual sensor is placed with respect to a body of the vehicle.

In one embodiment of this invention, the display section displays an image obtained by combining a first perspective image derived from the first omniazimuth visual sensor and a second perspective image derived from the second omniazimuth visual sensor.

In one embodiment of this invention, the image processor includes a storage section for storing mobile body image data; the image processor combines the mobile body image data from the storage section with the perspective image data derived from the optical system; and the display section displays based on the combined image data a perspective image including the image showing the mobile body.

In one embodiment of this invention, the mobile body image data is image data created by using computer graphics software.

In one embodiment of this invention, the mobile body image data is image data obtained by capturing an image of the mobile body.

In one embodiment of this invention, the omniazimuth visual system further includes a temperature measurement section for measuring an environmental temperature of the mobile body; when the environmental temperature measured by the temperature measurement section is equal to or lower than a predetermined temperature, the display section displays the perspective bird's-eye image of the mobile body and surroundings thereof after the mobile body becomes movable.

In one embodiment of this invention, when the display section displays a perspective image of an overlapping region between a display region of a perspective bird's-eye image of the mobile body and surroundings thereof which is obtained through the first omniazimuth visual sensor and a display region of a perspective bird's-eye image of the mobile body and surroundings thereof which is obtained through the second omniazimuth visual sensor, the display section displays based on control by the display control section a perspective image derived from one of the first omniazimuth visual sensor and the second omniazimuth visual sensor.

Furthermore, when the environmental temperature of the mobile body is lower than a predetermined temperature, the display section preferably displays a bird's-eye image of the mobile body and surroundings thereof after the mobile body becomes movable. In order to obtain a bird's-eye image of the mobile body and surroundings thereof, the omniazimuth visual sensor is preferably positioned such that the viewing angle of the omniazimuth visual sensor is perpendicular to a most likely moving direction. When the mobile body is a vehicle, the omniazimuth visual sensor is positioned such that the omniazimuth visual sensor can obtain a perspective image from a direction which is 90° from the horizontal plane (direction downwardly perpendicular to the horizontal plane). When a perspective image obtained by converting an image obtained through such an omniazimuth visual sensor is displayed, the operator of the mobile body can readily check the safety around the mobile body.

In the present specification, an optical image which is central-projection-transformed by an optical system is regarded as an image around the optical system which is seen from one of a plurality of focal points of the optical system.

Hereinafter, functions of the present invention will be described.

According to the present invention, an optical system of an omniazimuth visual sensor is capable of central projection transformation of an image around the optical system. This optical system includes, for example, a hyperboloidal mirror which has a shape of one sheet of a two-sheeted hyperboloid. In the optical system, the optical axis of the hyperboloidal mirror is identical with the optical axis of the imaging lens included in the imaging section of the omniazimuth visual sensor, and the principal point of the imaging lens is located at one of the focal points of the hyperboloidal mirror.

An optical image obtained through such an optical system is transformed into image data by the imaging section, and the image data is transformed into at least one of a panoramic image data and a perspective image data.

The display section displays at least one of a panoramic image corresponding to the panoramic image data and a perspective image corresponding to the perspective image data.

An optical image obtained by the imaging section is regarded as an image seen from one of the focal points of the optical system. Thus, the optical image can be transformed into a panoramic image or a perspective image by performing coordinate transformation from a polar coordinate into a rectangular coordinate.

Selection of an image to be displayed or selection of the size of the image to be displayed is performed by the display control section.

In one embodiment, an omniazimuth visual sensor is located such that perspective bird's-eye image data of the mobile body and surroundings thereof can be obtained. When the mobile body is a vehicle, in general, a bird's-eye image of the vehicle and surroundings thereof can be displayed by downwardly shifting the viewing direction of a perspective image obtained through the omniazimuth visual sensor so as to be 90° with respect to a horizontal plane.

With such a structure, the display section can displays a perspective bird's-eye image of the mobile body and surroundings thereof.

As a result, the driver does not need to switch a plurality of cameras, to select one among these cameras for display on a display device, or to change the orientation of the camera, as in a conventional vehicle surveillance apparatus where each camera is designed for one directional surveillance.

The display section displays a perspective image of an area within the surrounding area of the omniazimuth visual sensor which is opposite to the most likely moving direction of the mobile body.

Alternatively, the display section can display an image obtained by performing, in response to control by the display control section, at least one of (vertical and/or horizontal) translational transfer processing (tilt/pan processing) and scale-up/scale-down (zoom-in/zoom-out) processing.

Thus, such a function is useful when the driver has to check the distance between his/her own vehicle and adjacent vehicles or obstacles: for example, especially when the driver parks the vehicle in a carport or parking lot or drives the vehicle out of the carport or parking lot, or when the driver parks or stops the vehicle as close to the edge of the adjacent vehicles or obstacles as possible.

In the present specification, the "scale-up/scale-down" operation refers to one of a scale-up operation and a scale-down operation.

When the optical system is positioned such that an optical axis of the optical system is perpendicular to the most likely moving direction of the mobile body, a perspective image obtained by converting an image captured by the optical system can be a bird's-eye image of the entire mobile body seen from a position right above the mobile body. In such a case, for example, a driver can readily check the distance between his/her own vehicle and adjacent vehicles or obstacles when the driver parks the vehicle in a carport or parking lot or drives the vehicle out of the carport or parking lot, or when the driver parks or stops the vehicle as close to the edge of the adjacent vehicles or obstacles as possible. Even if the optical axis of the optical system is not perpendicular to the horizontal plane, a desired image can be obtained by changing the viewing direction of a perspective image obtained through the omniazimuth visual sensor so as to be downwardly perpendicular to the horizontal plane.

Furthermore, when the display section displays a perspective image of the mobile body in response to control by the display control section, the perspective image can be shifted such that the mobile body is shown in a desired portion of the displayed perspective image (for example, the center of the displayed perspective image). In such a case, the driver of the mobile body can readily recognize the surroundings of the mobile body.

Furthermore, when an image of a mobile body which is previously captured or previously created by using computer graphics software is displayed on a predetermined place of the display screen of the display section, the operator of the mobile body can readily recognize the positional relationship between the mobile body and objects around the mobile body (obstacles or the like).

Furthermore, the display section simultaneously displays an image seen in a direction opposite to a most likely moving direction of the mobile body and an image seen in a direction which is not identical or opposite to the most likely moving direction of the mobile body. With such a structure, the driver can readily check an area which can be seen in a direction different from the most likely moving direction. In general, an operator of the mobile body faces the most likely moving direction. Thus, it is significant in view of safety to check the area which can be seen in a direction different from the most likely moving direction.

For example, when the mobile body is a vehicle, two omniazimuth visual sensors are placed such that one is on a front bumper and the other is on a rear bumper, whereby the driver's blind areas can be readily observed. Especially when one omniazimuth visual sensor is placed at one of a front right corner and a front left corner of the vehicle, and the other is placed at the diagonal rear corner of the vehicle, an image with about a 360° view field around the entire mobile body can be obtained near areas in close proximity to the vehicle which are the driver's blind areas.

Furthermore, the display section displays a perspective image obtained by combining a perspective bird's-eye image of the vehicle and surroundings thereof which is derived from an omniazimuth visual sensor placed at a front corner of the vehicle and a perspective bird's-eye image of the vehicle and surroundings thereof which is derived from another omniazimuth visual sensor placed at a diagonal rear corner of the vehicle. With such an arrangement, images around the entire vehicle can be displayed in one display screen. Thus, the driver can readily check the safety around the vehicle.

Furthermore, in the case where the environmental temperature is decreased to or below a certain temperature, for example, in areas of high altitude, areas of high latitude regions, during winter, etc., and difficulty is caused on an operator of a mobile body in looking outside from the inside of the mobile body (when a window glass of a vehicle is fogged), the display section displays a perspective bird's-eye image of the mobile body and surroundings thereof after the mobile body becomes movable, whereby the operator of the mobile body can readily check the safety around the mobile body. For example, when the mobile body is a vehicle, an image of the surroundings of the vehicle can be displayed by downwardly shifting the viewing direction of a perspective image obtained through the omniazimuth visual sensor so as to be 90° with respect to a horizontal plane.

Thus, the invention described herein makes possible the advantages of (1) providing a surround surveillance apparatus for readily observing surroundings of a mobile body in order to reduce a driver's burden and improve the safety around the mobile body, and (2) providing a surround surveillance apparatus which can enable an operator of a mobile body to quickly grasp the conditions around the mobile body after the mobile body becomes movable.

These and other advantages of the present invention will become apparent to those skilled in the art upon reading and understanding the following detailed description with reference to the accompanying figures.

BRIEF DESCRIPTION OF THE DRAWINGS

FIG. 5 illustrates an example of panoramic (360°) image transformation according to embodiment 1. Part (a) shows an input round-shape image. Part (b) shows a donut-shape image subjected to the panoramic image transformation. Part (c) shows a panoramic image obtained by transformation into a rectangular coordinate.

FIG. 6 illustrates a perspective transformation in the surround surveillance apparatus according to embodiment 1.

DESCRIPTION OF THE PREFERRED EMBODIMENTS

Hereinafter, embodiments of the present invention will be described with reference to the drawings.

Embodiment 1

Figure 1A:
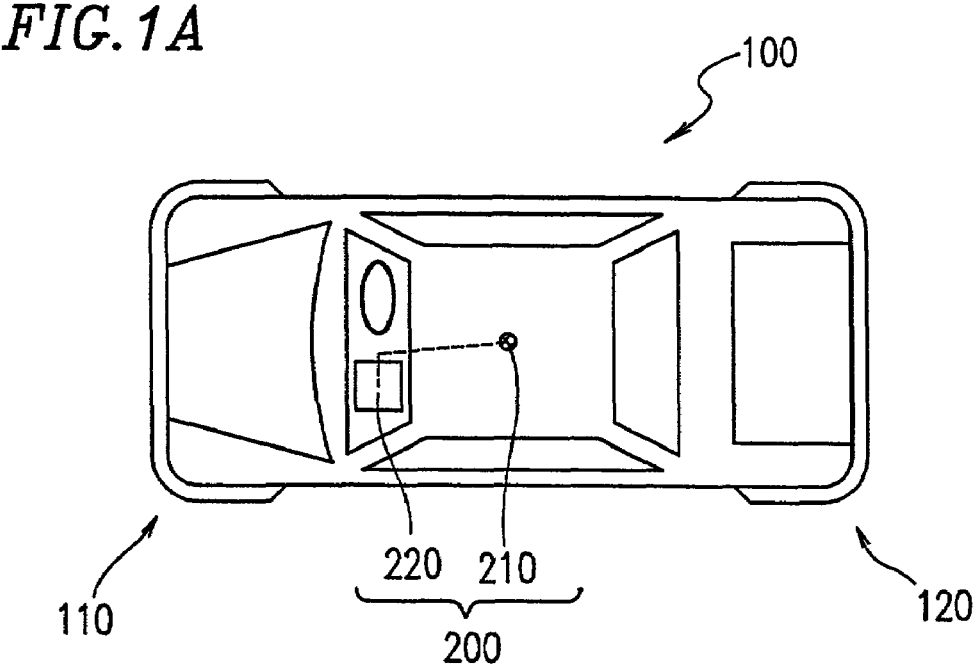
FIG. 1A is a plan view showing a structure of a vehicle incorporating a surround surveillance apparatus according to embodiment 1 of the present invention.
Figure 1B:
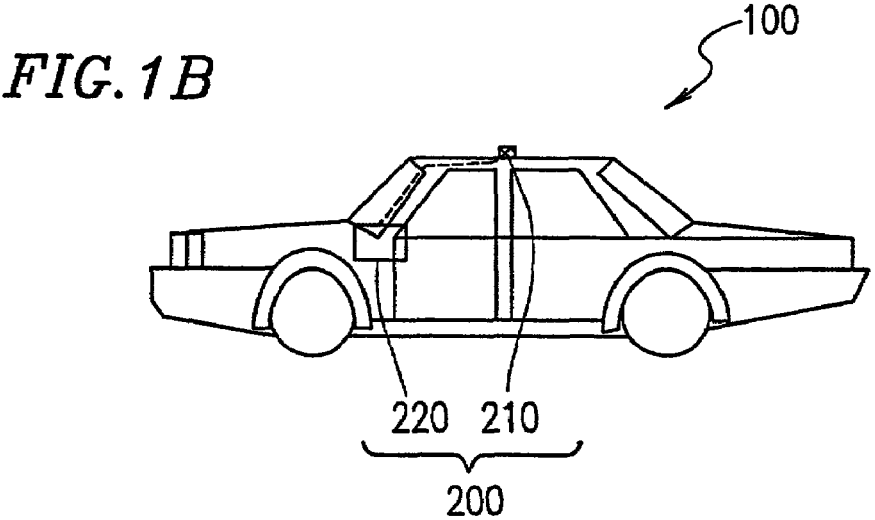
FIG. 1B is a side view showing the vehicle of FIG. 1A.

FIG. 1A is a plan view showing a structure of a mobile body 100 incorporating a surround surveillance apparatus 200 according to embodiment 1 of the present invention. FIG. 1B is a side view showing the mobile body 100 of FIG. 1A.

In embodiment 1, a vehicle is described as a specific example of the mobile body 100.

In embodiment 1, the vehicle 100 incorporates a surround surveillance apparatus 200 for a mobile body. As shown in FIGS. 1A and 1B, the surround surveillance apparatus 200 includes an omniazimuth visual sensor 210 and an arithmetic/control section 220. The omniazimuth visual sensor 210 is placed on a roof of the vehicle 100. The arithmetic/control section 220 is provided, for example, in a place near the driver's seat of the vehicle 100.

The omniazimuth visual sensor 210 shown in FIGS. 1A and 1B has an omniazimuth view filed with a 360° view field around itself in a generally horizontal direction.

Figure 1C:
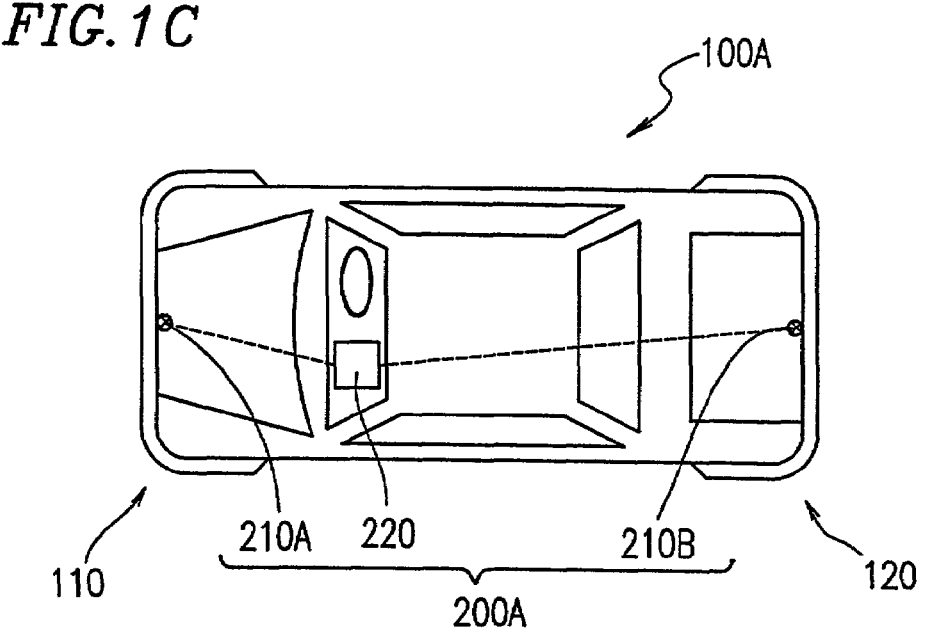
FIG. 1C is a plan view showing a structure of a variation of the vehicle incorporating the surround surveillance apparatus according to embodiment 1 of the present invention.
Figure 1D:
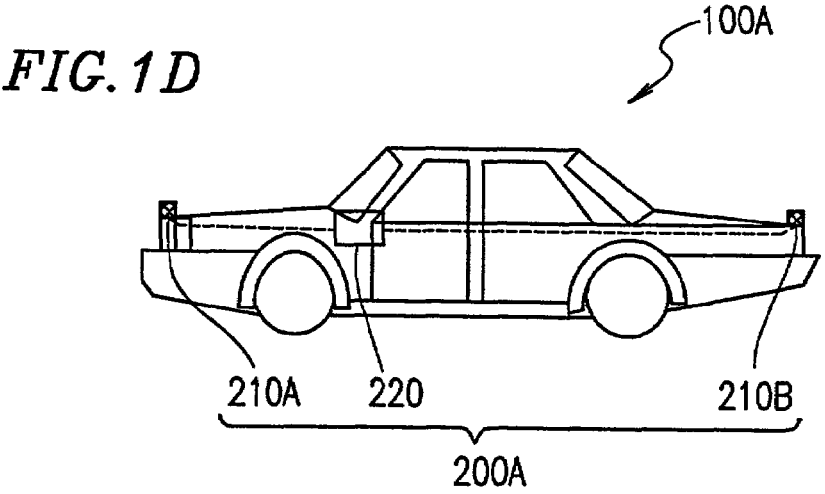
FIG. 1D is a side view showing the vehicle of FIG. 1C.

FIG. 1C is a plan view showing a structure of a mobile body 100A incorporating a surround surveillance apparatus 200A according to embodiment 1 of the present invention. FIG. 1D is a side view showing the mobile body 100A of FIG. 1C. The vehicle 100A incorporates a surround surveillance apparatus 200A for a mobile body. As shown in FIGS. 1C and 1D, the surround surveillance apparatus 200A includes a first omniazimuth visual sensor 210A, a second omniazimuth visual sensor 210B, and an arithmetic/control section 220. The first omniazimuth visual sensor 210A is placed on a front side of the vehicle 100A (forward direction side of the vehicle 100A). The second omniazimuth visual sensor 210B is placed on a rear side of the vehicle 100A (backward direction side of the vehicle 100A). The arithmetic/control section 220 is provided in a place near the driver's seat of the vehicle 100A.

The vehicle 100A further includes a front bumper 110 and a rear bumper 120.

In embodiment 1, the first omniazimuth visual sensor 210A is placed on the central portion of the front bumper 110, and the second omniazimuth visual sensor 210B is placed on the central portion of the rear bumper 120. Each of the first omniazimuth visual sensor 210A and the second omniazimuth visual sensor 210B has an omniazimuth view filed with a 360° view field around itself in a generally horizontal direction.

However, a half of the view field (about 180° rear view field) of the first omniazimuth visual sensor 210A is blocked by the vehicle 100A. That is, the effective view field of the first omniazimuth visual sensor 210A is limited to the 180° frontal view field (from the left side to the right side of the vehicle 100A). Similarly, a half of the view field (about 180° frontal view field) of the second omniazimuth visual sensor 210B is blocked by the vehicle 100A. That is, the effective view field of the second omniazimuth visual sensor 210B is limited to the 180° rear view field (from the left side to the right side of the vehicle 100A).

Figure 2:
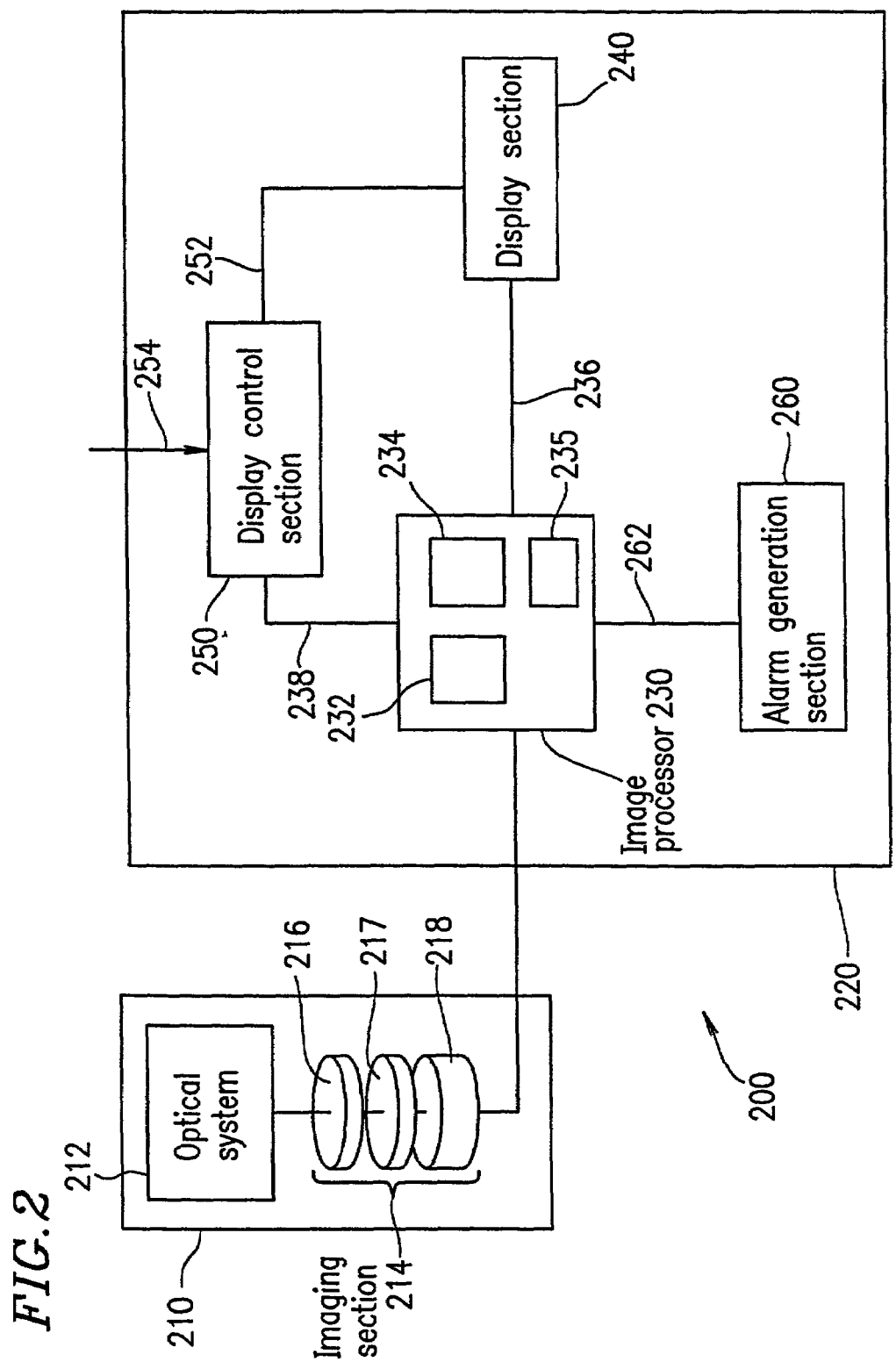
FIG. 2 is a block diagram showing a configuration of the surround surveillance apparatus according to embodiment 1.

FIG. 2 is a block diagram showing a configuration of the surround surveillance apparatus 200 according to embodiment 1.

The surround surveillance apparatus 200 includes: the omniazimuth visual sensor 210 for converting an image obtained from the surroundings of the omniazimuth visual sensor 210 into an image data; and the arithmetic/control section 220 for processing the image data converted by the omniazimuth visual sensor 210 and displaying an image corresponding to the processed image data. It should be noted that the surround surveillance apparatus 200A shown in FIGS. 1C and 1D has substantially the same function as that of the surround surveillance apparatus 200 except that the surround surveillance apparatus 200A includes two omniazimuth visual sensors. Furthermore, each of the first omniazimuth visual sensor 210A and the second omniazimuth visual sensor 210B shown in FIGS. 1C and 1D has substantially the same function as that of the omniazimuth visual sensor 210.

The omniazimuth visual sensor 210 includes: an optical system 212 capable of obtaining an image with a view field area therearound and capable of central projection transformation of the image; and an imaging section 214 for converting the image obtained by the optical system 212 into image data. The imaging section 214 includes: an imaging lens 216; a light receiving section 217 for receiving a central projection-converted optical image; and an image data generation section 218 for converting the optical image received by the light receiving section 217 into image data.

The arithmetic/control section 220 includes: an image processor 230 for converting image data converted by the imaging section 214 into at least one of panoramic image data and perspective image data; a display section 240 for displaying an output 236 from the image processor 230; and a display control section 250 for controlling, based on an output 238 from the image processor 230 and/or an externally-supplied input 254, the selection among images of surroundings of the vehicle 100 (FIGS. 1C and 1D) and the size of the selected image to be displayed on the display section 240. The image processor 230 outputs an output 262 to an alarm generation section 260, when necessary, so that the alarm generation section 260 generates an alarm. The image processor 230 includes an image transformation section 232, an output buffer memory 234, and a storage section 235. The display section 240 displays at least one of a panoramic image corresponding to panoramic image data and a perspective image corresponding to perspective image data. The storage section 235 stores data for the image processing process performed in the image processor 230. For example, the storage section 235 stores a bird's-eye image of the vehicle 100 or 100A which has been captured from a position right above the vehicle 100 or 100A.

For example, the image processor 230 can be placed in an engine compartment at the frontal end of the vehicle 100 or in a luggage compartment at the rear end of the vehicle 100. The display section 240 and the display control section 250 can be placed in or beside a front panel near the driver's seat.

Hereinafter, each of the above components is described in detail.

Figure 3:
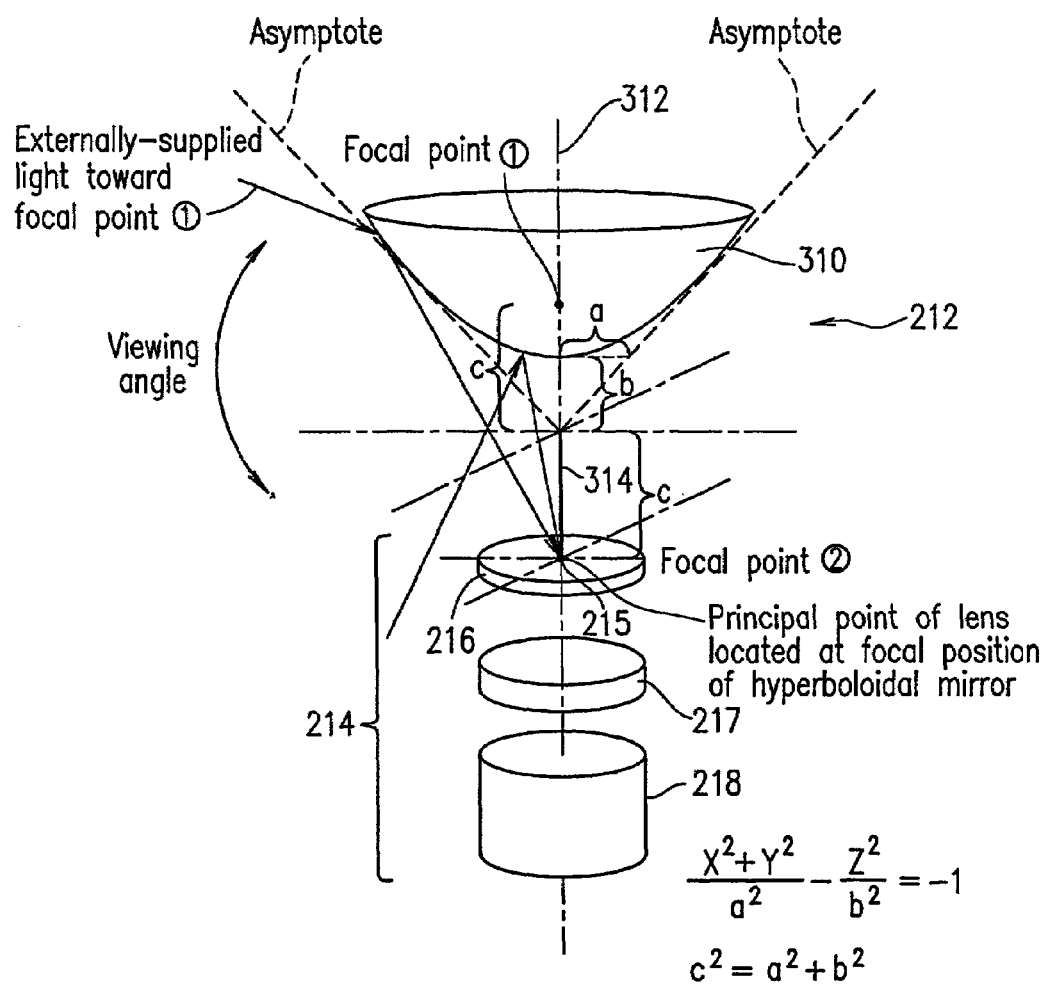
FIG. 3 shows an exemplary structure of an optical system used in the surround surveillance apparatus according to embodiment 1.

FIG. 3 shows a specific example of the optical system 212 capable of central projection transformation.

Herein, the optical system 212 includes a hyperboloidal mirror 310 which has a shape of one sheet of a two-sheeted hyperboloid. The imaging lens 216 and the hyperboloidal mirror 310 are positioned such that the optical axis (z-axis) 312 of the hyperboloidal mirror 310 is identical with the optical axis 314 of the imaging lens 216 included in the imaging section 214. The first principal point 215 of the imaging lens 216 is located at one of focal points of the hyperboloidal mirror 310 (focal point ②). In such a structure, central projection transformation is possible, i.e., an image obtained by the imaging section 214 corresponds to an image around the hyperboloidal mirror 310, which is seen from the focal point ① of the hyperboloidal mirror 310. The optical system 212 having such a structure is disclosed in, for example, Japanese Laid-Open Publication No. 6-295333, and only several features of the optical system are herein described.

In FIG. 3, the hyperboloidal mirror 310 is formed by providing a mirror on a convex surface of a body defined by one of curved surfaces obtained by rotating hyperbolic curves around a z-axis (two-sheeted hyperboloid), i.e., a region of the two-sheeted hyperboloid where Z>0. This two-sheeted hyperboloid is represented as:

$$(X^2+Y^2)/a^2 - Z^2/b^2 = -1$$

$$c^2 = (a^2+b^2) \qquad (1)$$

where a and b are constants for defining a shape of the hyperboloid, and c is a constant for defining a focal point of the hyperboloid. Hereinafter, the constants a, b, and c are generically referred to as "mirror constants". Since the hyperboloidal mirror 310 has a curved surface obtained by rotating a hyperbolic curve, the rotation axis of the hyperbolic curve is identical with the optical axis 312 of the hyperboloidal mirror 310.

The hyperboloidal mirror 310 has two focal points ① and ②. All light from outside which travels toward one of these focal points (in this case, focal point ①) is reflected by the hyperboloidal mirror 310 so as to reach the other focal point (in this case, focal point ②). The hyperboloidal mirror 310 and the imaging section 214 are positioned such that the optical axis 312 of the hyperboloidal mirror 310 is identical with the optical axis 314 of the imaging lens 216 of the imaging section 4b, and the first principal point 215 of the imaging lens 216 is located at focal point ②. With such a configuration, an image obtained by the imaging section 214 corresponds to an image which is always seen from focal point ① of the hyperboloidal mirror 310 regardless of a viewing direction and which can be converted into image data. It should be noted that, in this case, an image inside the hyperboloidal mirror 310 cannot be obtained. Furthermore, since the imaging section 214 has a certain size, the imaging section 214 does not receive light which is blocked by the imaging section 214 from reaching focal point ① of the hyperboloidal mirror 310.

The imaging section 214 may be a video camera. The imaging section 214 converts an optical image obtained through the hyperboloidal mirror 310 of FIG. 3 into image data using a solid-state imaging device, such as CCD, CMOS, etc. The converted image data is transmitted to the image processor 230.

Figure 4A:
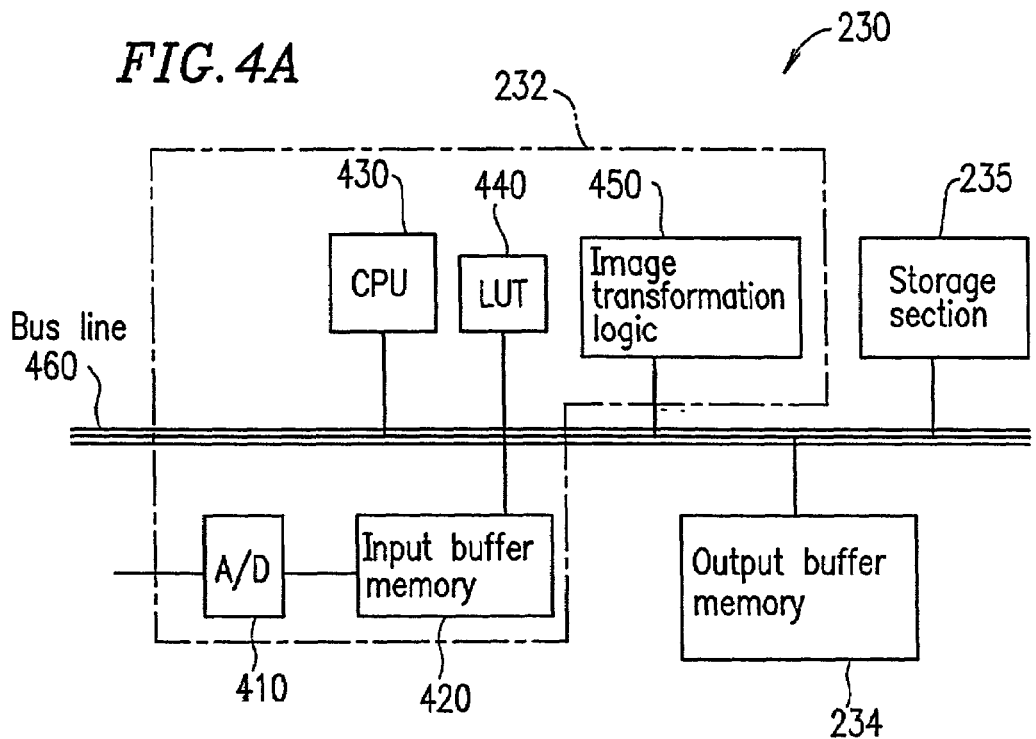
FIG. 4A is a block diagram showing a structure of an image processor used in the surround surveillance apparatus according to embodiment 1.

FIG. 4A is a block diagram showing a structure of the image processor 230.

The image processor 230 includes the image transformation section 232 and the output buffer memory 234. The image transformation section 232 includes an A/D converter 410, an input buffer memory 420, a CPU 430, a lookup table (LUT) 440, and an image transformation logic 450. Each component of the image transformation section 232 is connected to the output buffer memory 234 via a bus line 460.

Figure 4B:
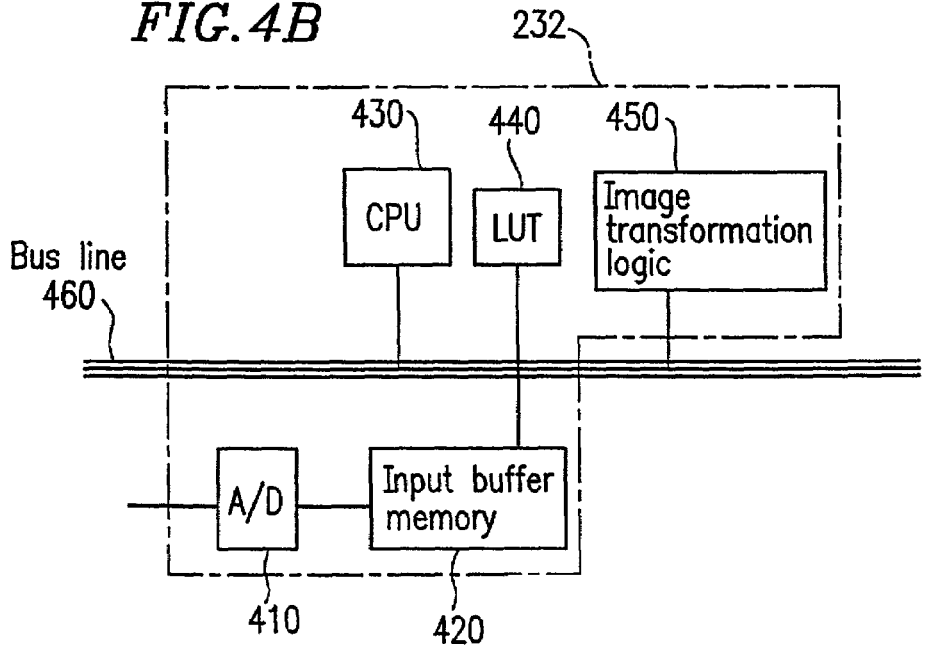
FIG. 4B is a block diagram showing a structure of an image transformation section used in the surround surveillance apparatus according to embodiment 1.

FIG. 4B is a block diagram showing a structure of the image transformation section 232.

The image transformation section 232 receives image data obtained by converting an optical image obtained by the imaging section 214. When the image data is an analog signal, the analog signal is converted by the A/D converter 410 into a digital signal, and the digital signal is transmitted to the input buffer memory 420. When the image data is a digital signal, the image data is directly transmitted to the input buffer memory 420.

In the image transformation section 232, an output (image data) from the input buffer memory 420 is subjected to image processing when necessary. For example, the image transformation logic 450 uses the LUT 440 so as to transform the image data into at least one of panoramic image data and perspective image data, or so as to translationally (vertically/horizontally) move or scale-up/scale-down an image to be displayed. After image processing, the processed image data is input to the output buffer memory 234 shown in FIG. 4A. During processing, the components are controlled by the CPU 430. The CPU 430 may be a RISC (reduced instruction set computer) or a CISC (complex instruction set computer).

A principle of the image transformation by the image transformation logic 450 is now described. The image transformation includes a panoramic transformation for obtaining a panoramic (360°) image and a perspective transformation for obtaining a perspective image. Furthermore, a perspective image can be horizontally and rotationally transferred (horizontal transfer, so-called "pan movement") and vertically and rotationally transferred (vertical transfer, so-called "tilt movement"). In this specification, at least one of the horizontal rotational transfer and the vertical rotational transfer is referred to as a "translational transfer".

First, a panoramic (360°) image transformation is described with reference to FIG. 5. Referring to part (a) of FIG. 5, an image 510 is a round-shape image obtained by the imaging section 214. Part (b) of FIG. 5 shows a donut-shape image 515 subjected to the panoramic image transformation. Part (c) of FIG. 5 shows a panoramic image 520 obtained by transforming the image 510 into a rectangular coordinate.

Part (a) of FIG. 5 shows the input round-shape image 510 which is formatted in a polar coordinate form in which the center point of the image 510 is positioned at the origin (Xo,Yo) of the coordinates. In this polar coordinate, a pixel P in the image 510 is represented as P(r,θ). Referring to part (c) of FIG. 5, in the panoramic image 520, a point corresponding to the pixel P in the image 510 (part (a) of FIG. 5) can be represented as P2(x,y). When the round-shape image 510 shown in part (a) of FIG. 5 is transformed into the square panoramic image 520 shown in part (c) of FIG. 5 using a point PO(ro,θo) as a reference point, this transformation is represented by the following expressions:

$$x = \theta - \theta o$$

$$y = r - ro$$

When the input round-shape image 510 (part (a) of FIG. 5) is formatted into a rectangular coordinate such that the center point of the round-shape image 510 is positioned at the origin of the rectangular coordinate system, (Xo,Yo), the point P on the image 510 is represented as (X,Y). Accordingly, X and Y are represented as:

$$X = Xo + r \times \cos\theta$$

$$Y = Yo + r \times \sin\theta$$

Thus, $$X = (y+ro) \times \cos(x+\theta o) + Xo$$

$$Y=(y+ro) \times \sin(x+\theta o)+Yo$$

The pan/tilt movement for a panoramic image can be achieved by changing the position of the reference point PO(ro,θo) to another position. The pan movement is achieved by changing the value of "θo". The tilt movement is achieved by changing the value of "ro". However, in embodiment 1, the tilt movement is not performed because the resultant image leaves the transformation region.

Next, a perspective transformation is described with reference to FIG. 6. In the perspective transformation, the position of a point on the input optical image obtained by a light receiving section 217 of the imaging section 214 which corresponds to a point in a three-dimensional space is calculated, and image information at the point on the input optical image is allocated to a corresponding point on a perspective-transformed image, whereby coordinate transformation is performed.

In particular, as shown in FIG. 6, a point in a three-dimensional space is represented as P3, a point corresponding thereto which is on a round-shape image formed on a light receiving plane of a light receiving section 217 of the imaging section 214 is represented as R(r,θ), and the focal distance of the imaging lens 216 is F. The light receiving section 217 is placed at a position which is distant from the imaging lens 216 by the focal distance F. Further, mirror constants of the hyperboloidal mirror 310 are (a, b, c), which are the same as a, b, and c in FIG. 3. With these parameters, expression (2) is obtained:

$$r=F \times \tan((\pi/2)-\beta) \quad (2)$$

In FIG. 6, α is an incident angle of light which travels from an object point (point P3) toward focal point (①) with respect to a horizontal plane including focal point ①; β is an incident angle of light which comes from point P3, is reflected at a point on the hyperboloidal mirror 310, and enters into the imaging lens 216 (note that angle β is not an angle with respect to the optical axis 314 of the imaging lens 216 but an angle with respect to a surface of the imaging lens 216 which is perpendicular to the optical axis 314). Algebraic numbers α, β, and θ are represented as follows:

$$\beta=\arctan(((b^2+c^2) \times \sin \alpha - 2 \times b \times c)/(b^2-c^2) \times \cos \alpha)$$

$$\alpha=\arctan(tz/sqrt(tx^2+ty^2))$$

$$\theta=\arctan(ty/tx)$$

From the above, expression (2) is represented as follows:

$$r=F \times (((b^2-c^2) \times sqrt(tx^2+ty^2))/((b^2+c^2) \times tz - 2 \times b \times c \times sqrt(tx^2+ty^2+tz^2))) \quad (2')$$

The coordinate of a point on the round-shape image 510 is transformed into a rectangular coordinate R (X,Y). X and Y are represented as:

$$X=r \times \cos \theta \quad (3)$$

$$Y=r \times \sin \theta \quad (4)$$

Accordingly, from the above expressions:

$$X=F \times (((b^2-c^2) \times tx/((b^2+c^2) \times tz - 2 \times b \times c \times sqrt(tx^2+ty^2+tz^2))) \quad (5)$$

$$Y=F \times (((b^2-c^2) \times ty/((b^2+c^2) \times tz - 2 \times b \times c \times sqrt(tx^2+ty^2+tz^2))) \quad (6)$$

Next, the horizontal rotational transfer and the vertical rotational transfer are described.

Now, referring to FIG. 6, consider a square image plane having width W and height h located in the three-dimensional space at a position corresponding to a rotation angle θ around the Z-axis 312 where R is a distance between the plane and focal point ① of the hyperboloidal mirror 310, and φ is a depression angle (which is equal to the incident angle α). The center of the square image plane is point P3. Parameters of a point at the upper left corner of the square image plane, point Q (tx,ty,tz), are represented as follows:

$$tx=(R \cos \phi+(h/2)\sin \phi)\cos \theta-(W/2)\sin \theta \quad (7)$$

$$ty=(R \cos \phi+(h/2)\sin \phi)\sin \theta-(W/2)\cos \theta \quad (8)$$

$$tz=R \sin \phi-(h/2)\cos \phi \quad (9)$$

By combining expressions (7), (8), and (9) into expressions (5) and (6), it is possible to obtain the coordinate (X,Y) of a point on the round-shape image formed on the light receiving section 217 of the imaging section 214 which corresponds to point Q of the square image plane as follows:

Furthermore, assume that the square image plane is transformed into a perspective image divided into pixels each having a width n and a height m. In expressions (7), (8), and (9), the parameter W is changed in a range from W to −W by units of W/n, and the parameter h is changed in a range from h to −h by units of h/m, whereby coordinates of points on the square image plane are obtained. According to these obtained coordinates of the points on the square image plane, image data at points on the round-shape image formed on the light receiving section 217 which correspond to the points on the square image plane is transferred onto a perspective image so as to be displayed on the display section 240 (FIG. 2).

Next, a horizontal rotational movement (pan movement) and a vertical rotational movement (tilt movement) in the perspective transformation are described. First, a case where point Q as mentioned above is horizontally and rotationally moved (pan movement) is described. A coordinate of a point obtained after the horizontal rotational movement, point Q' (tx',ty',tz'), is represented as follows:

$$tx'=(R \cos \phi+(h/2)\sin \phi)\cos(\theta+\Delta\theta)-(W/2)\sin(\theta+\Delta\theta) \quad (12)$$

$$ty'=(R \cos \phi+(h/2)\sin \phi)\sin(\theta+\Delta\theta)+(W/2)\cos(\theta+\Delta\theta) \quad (13)$$

$$tz'=R \sin \theta-(h/2)\cos \phi \quad (14)$$

where Δθ denotes a horizontal movement angle.

By combining expressions (12), (13), and (14) into expressions (5) and (6), the coordinate (X,Y) of a point on the round-shape image 510 formed on the light receiving section 217 which corresponds to the point Q' (tx',ty',tz') can be obtained. This applies to other points (other than point Q) on the round-shape image 510. In expressions (12), (13), and (14), the parameter W is changed in a range from W to −W by units of W/n, and the parameter h is changed in a range from h to −h by units of him, whereby coordinates of points on the square image plane are obtained. According to these obtained coordinates of the points on the square image plane, image data at points on the round-shape image 510 formed on the light receiving section 217 which correspond to the point Q' (tx',ty',tz') is transferred onto a perspective image, whereby a horizontally rotated image can be obtained.

Next, a case where point Q as mentioned above is vertically and rotationally moved (tilt movement) around the Z-axis 312 is described. A coordinate of a point obtained after the vertical rotational movement, point Q'' (tx'',ty'',tz''), is represented as follows:

$$tx'' = (R\cos(\phi+\Delta\phi)+(h/2)\sin(\phi+\Delta\phi))\times\cos\theta - (W/2)\sin\theta \quad (15)$$

$$ty'' = (R\cos(\phi+\Delta\phi)+(h/2)\sin(\phi+\Delta\phi))\times\sin\theta + (W/2)\cos\theta \quad (16)$$

$$tz'' = R\sin(\phi+\Delta\phi) - (h/2)\cos(\phi+\Delta\phi) \quad (17)$$

where $\Delta\phi$ denotes a vertical movement angle.

By combining expressions (15), (16), and (17) into expressions (5) and (6), the coordinate (X,Y) of a point on the round-shape image 510 formed on the light receiving section 217 which corresponds to the point Q'' (tx'',ty'',tz'') can be obtained. This applies to other points on the round-shape image. In expressions (15), (16), and (17), the parameter W is changed in a range from W to −W by units of W/n, and the parameter h is changed in a range from h to −h by units of h/m, whereby coordinates of points on the square image plane are obtained. According to these obtained coordinates of the points on the square image plane, image data at points on the round-shape image 510 formed on the light receiving section 217 which correspond to the point Q'' (tx'',ty'',tz'') is transferred onto a perspective image, whereby a vertically rotated image can be obtained.

Further, a zoom-in/zoom-out function for a perspective image is achieved by one parameter, the parameter R. In particular, when the parameter R in expressions (4) through (12) is decreased while the parameters W and h are fixed, a view range from focal point ① is decreased, so that an image equivalent to a zoomed-out image which can be obtained by a zoom-out operation of the optical system is obtained. When the parameter R in expressions (4) through (12) is increased while the parameters W and h are fixed, a view range from focal point ① is increased, so that an image equivalent to a zoomed-in image which can be obtained by a zoom-in operation of the optical system is obtained.

For example, consider a case where the omniazimuth visual sensor 210 is attached to the vehicle 100 such that the optical axis 314 of the imaging section 214 is perpendicular to the ground. When the viewing direction of a perspective image is selected by the vertical rotational transfer such that $\alpha = -90°$, a perspective view obtained is a bird's-eye view of the vehicle 100 and surroundings thereof which is seen downward from a position right above the vehicle 100. In this case, the viewing area can be enlarged by decreasing the parameter R as described above so as to obtain a zoomed-out view, whereas a zoomed-in view can be obtained by increasing the parameter R. Furthermore, by performing a zoom-in operation by control of the display control section 250 (e.g., a key operation), a bird's-eye view seen downward from a position right above the entire vehicle 100 which shows a certain area around the omniazimuth visual sensor 210 shown in FIGS. 1A and 1B and which covers the vehicle 100.

In the present specification, a "bird's-eye view" is a view seen from a position above the mobile body 100 in a direction perpendicular to the most likely moving direction of the mobile body 100.

Furthermore, in the present specification, the "most likely moving direction" is a direction in which the mobile body 100 moves with the highest probability. Generally, the mobile body 100 is designed in consideration of the most likely moving direction. Moreover, an operator of the mobile body 100 generally faces the most likely moving direction of the mobile body 100.

Furthermore, in the above example, a perspective view obtained by the omniazimuth visual sensor 210 is on a plane which is perpendicular to a selected viewing direction from focal point ① (e.g., in FIG. 6, a direction from focal point ① to point P3), and the range of the obtained perspective view equally extends on the plane around the line of the selected viewing direction from focal point ①. However, according to the present invention, it is apparent that by using expressions (5) and (6), any perspective view can be obtained from a plane within a three-dimensional space covered by the optical system of the omniazimuth visual sensor 210, and the plane from which such a perspective view is obtained may form any angle with respect to a selected viewing angle. For example, when the omniazimuth visual sensor 210 is placed at a corner of the generally rectangular vehicle 100 rather than on the roof of the vehicle 100, an image display on the display screen of the display section 240 may not show the vehicle 100 at the center of the display screen of the display section 240 because the range of the obtained perspective view equally extends around the line of the selected viewing direction from focal point ①.

In such a case, the image display on the display section 240 can be shifted such that the vehicle 100 is shown in the center of the image by shifting the variable range of parameters W and h in above expressions (15), (16), and (17). For example, consider a case where the width of the vehicle 100 is 21 w. In this case, in expressions (15), (16), and (17), the range of the image plane is vertically and horizontally shifted by (μ,v) (where $1 w = \sqrt{(\mu^2+v^2)}$), i.e., the range of the image plane is shifted from "W to −W (width)" and "h to −h (height)" to "W+μ to −W+μ" and "h+v to −h+v", respectively, whereby the vehicle 100 is shown in the center of the image displayed on the display section 240. Such processing can be achieved by adding μ and v to the parameters W and h, respectively, in the transformation processing of the image processor 230.

Referring now to FIG. 2, the display section 240 is, for example, a monitor using a cathode ray tube, LCD, EL, etc. The display section 240 receives an output from the output buffer memory 234 of the image processor 230 so as to display an image based on the received output. During this image display operation, the display control section 250 including a microcomputer can select an image to be displayed on the display section 240 (panoramic image and/or perspective image transformed by the image processor 230), and/or control the direction and size of an image to be displayed, etc.

Figure 7:
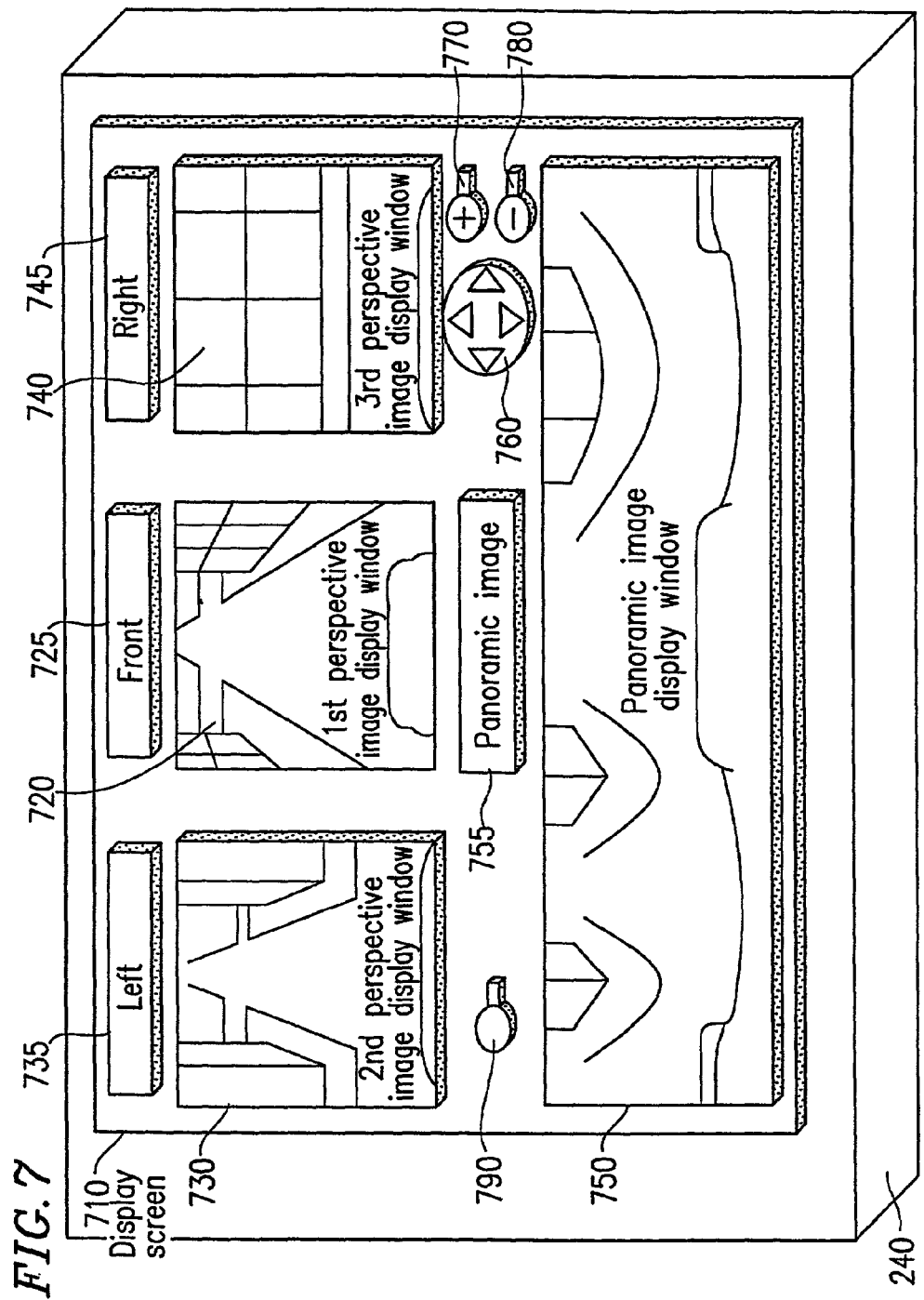
FIG. 7 shows an example of a display screen of a display section in the surround surveillance apparatus according to embodiment 1.

FIG. 7 shows a display screen 710 of the display section 240.

In FIG. 7, the display screen 710 includes: a first perspective image display window 720; a second perspective image display window 730; a third perspective image display window 740; and a panoramic image display window 750. In the default state, the first perspective image display window 720 displays a frontal view field perspective image from the vehicle 100; the second perspective image display window 730 displays a left view field perspective image from the vehicle 100; and the third perspective image display window 740 displays a right view field perspective image from the vehicle 100. The panoramic image display window 750 presents a panoramic image showing all around the vehicle 100.

The display screen 710 further includes: a first explanation display window 725 for showing an explanation of the first perspective image display window 720; a second explanation display window 735 for showing an explanation of the second perspective image display window 730; a third explanation display window 745 for showing an explanation of the third perspective image display window 740; and a fourth explanation display window 755 for showing an explanation of the panoramic image display window 750.

The display screen 710 further includes: a direction key 760 for vertically/horizontally scrolling perspective images to be displayed; a scale-up key 770 for scaling up images; and a scale-down key 780 for scaling down images.

The first through fourth explanation display windows 725, 735, 745, and 755 function as switches for activating the image display windows 720, 730, 740, and 750, respectively. A user activates a desired image display window (window 720, 730, 740, or 750) by means of a corresponding explanation display window (window 725, 735, 745, or 755) which functions as a switch, whereby the user can vertically/horizontally scroll and scale-up/down the image displayed in the activated window. Further, whether or not an image display window (window 720, 730, 740, or 750) is active may be indicated by the change of the display color of the corresponding explanation display window (window 725, 735, 745, or 755). The user can translationally (vertically/horizontally) scroll and/or scale-up/down the image displayed in each of the perspective image display windows 720, 730, and 740 using the direction key 760, the scale-up key 770, and the scale-down key 780. The user can translationally (vertically/horizontally) scroll and/or scale-up/down the image displayed in the panoramic image display window 750 by using the direction key 760. However, the image displayed in the panoramic image display window 750 is not scaled-up or scaled-down.

For example, when the user touches the first explanation display window 725, a signal is output to the display control section 250 (FIG. 2). In response to the touch, the display control section 250 changes the display color of the first explanation display window 725 or allows the first explanation display window 725 to flicker so as to indicate that the first perspective image display window 720 is active. Meanwhile, the first perspective image display window 720 becomes active, and the user can vertically/horizontally scroll and scale-up/down the image displayed in the window 720 using the direction key 760, the scale-up key 770, and the scale-down key 780. In particular, signals are sent from the direction key 760, the scale-up key 770, and the scale-down key 780 through the display control section 250 to the image transformation section 232 of the image processor 230 (FIG. 2). According to the signals from the direction key 760, the scale-up key 770, and the scale-down key 780, an image is transformed, and the transformed image is transmitted to the display section 240 (FIG. 2) and displayed on the screen of the display section 240.

The display screen 710 may further include an omniazimuth visual sensor switching key 790.

For example, a driver uses the omniazimuth visual sensor switching key 790 located on the display screen 710, and based on the operation of the switching key 790 by the driver, a signal is transmitted from the display control section 250 to the image processor 230 and the display section 240, whereby switching is performed between a frontal omniazimuth visual sensor (210A in FIGS. 1C and 1D) and a rear omniazimuth visual sensor (210B in FIGS. 1C and 1D) such that a visual sensor is selected. When the rear omniazimuth visual sensor 210B is selected, for example, an image derived from the rear omniazimuth visual sensor 210B is displayed. Thereafter, for example, the first perspective image display window 720 is selected from among the perspective image display windows 720, 730, and 740, and the image display in the window 720 is tilted up to −90° by the direction key 760, a bird's-eye image seen from a position right above the rear part of the vehicle 100A is obtained as described above. An example of such a bird's-eye image is shown in FIG. 8.

Figure 8:
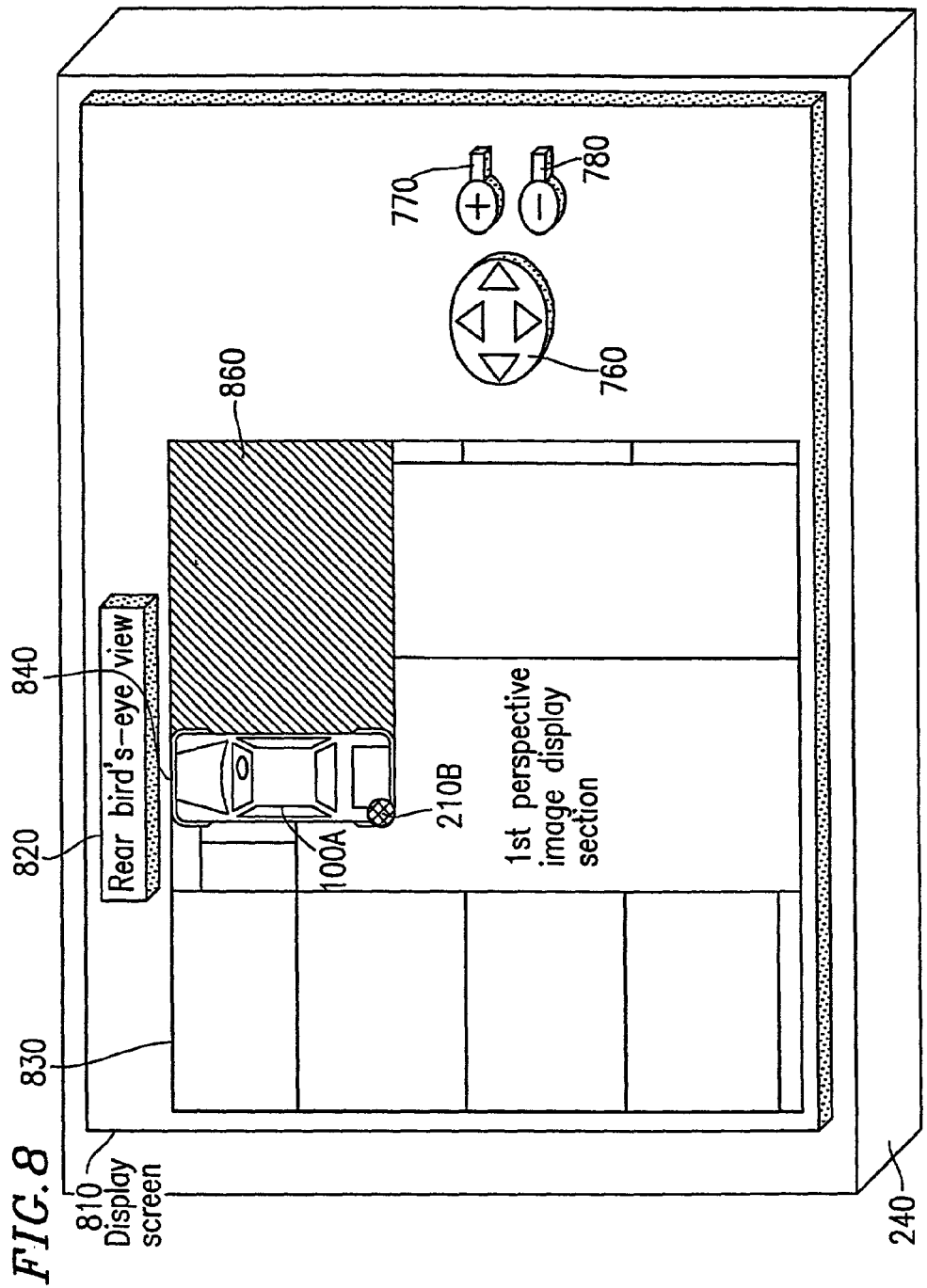
FIG. 8 shows another example of the display screen of the display section in the surround surveillance apparatus according to embodiment 1.

FIG. 8 shows another exemplary display screen 810 of the display section 240.

As shown in FIG. 8, the display screen 810 can displays only an enlarged first perspective image display windows 830. A first explanation display window 820 indicates that the first perspective image display windows 830 shows a rear bird's-eye image of the rear portion of vehicle 100A and surroundings thereof. This display of a bird's-eye image is useful when the driver has to check the distance between his/her own vehicle and adjacent vehicles or obstacles: for example, especially when the driver parks the vehicle in a carport or parking lot or drives the vehicle out of the carport or parking lot, or when the driver parks or stops the vehicle as close to the edge of the adjacent vehicles or obstacles as possible.

In the example illustrated in FIG. 8, an omniazimuth visual sensor 210B is placed at a corner of the vehicle 100. (Such an arrangement is described later in detail in embodiment 2.) In this case, about one fourth of the view field (about 90°) of the omniazimuth visual sensor 210B (area 860 in FIG. 8) is blocked by the vehicle 100. That is, the view field of the omniazimuth visual sensor 850 is about 270°, which is wider as compared with the omniazimuth visual sensor 210B placed on the central portion of the rear bumper 120 (see FIGS. 1C and 1D) which has about 180° rear view field.

Furthermore, each of the images displayed on the second perspective image display window 730 and the third perspective image display window 740 (FIG. 7) can be horizontally shifted by any angle within the 360° rotatable range. For example, when an image displayed on the second perspective image display window 730 or the third perspective image display window 740 is horizontally rotated by 90°, a frontward or backward perspective image of the vehicle 100 can be obtained. Furthermore, the display section 240 may be arranged such that the display screen can be switched between the display screen 710 (FIG. 7) and the display screen 810 (FIG. 8) by a single operation of an additional switch provided on the display screen.

Embodiment 2

Figure 9A:
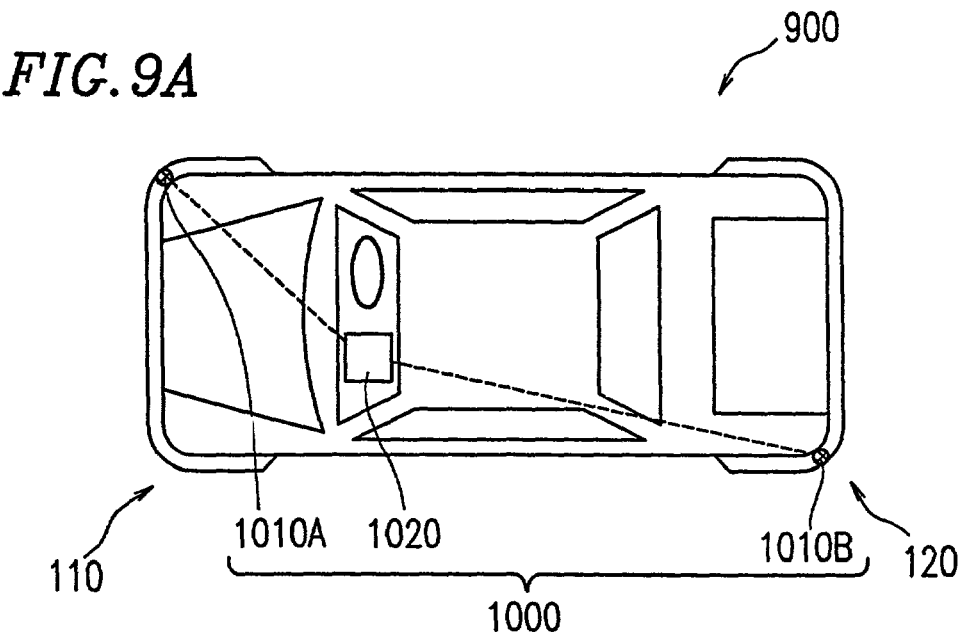
FIG. 9A is a plan view showing a vehicle including a surround surveillance apparatus for a mobile body according to embodiment 2 of the present invention.
Figure 9B:
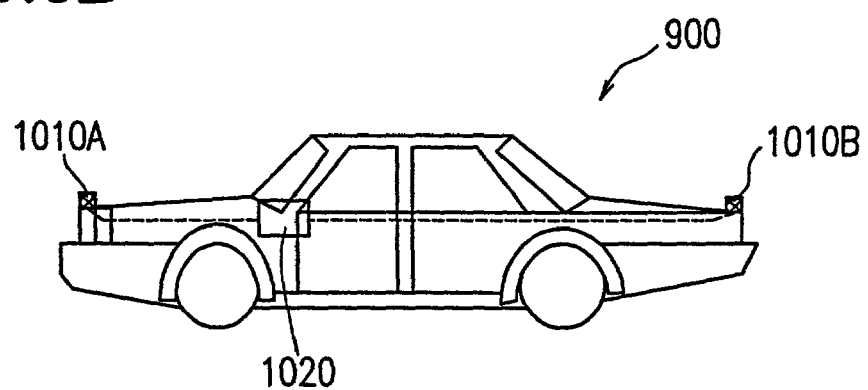
FIG. 9B is a side view of the vehicle shown in FIG. 9A.

FIG. 9A is a plan view showing a vehicle 900 which includes a surround surveillance apparatus 1000 for a mobile body according to embodiment 2 of the present invention. FIG. 9B is a side view of the vehicle 900.

Differences between the vehicle 900 of embodiment 2 and the vehicle 100A of embodiment 1 reside in that an omniazimuth visual sensor 100A is placed on the front right corner of the vehicle 900, and an omniazimuth visual sensor 1010B is placed on the rear left corner of the vehicle 900 diagonally to the sensor 1010A.

Each of the omniazimuth visual sensors 1010A and 1010B has an ominizimuth view field with a 360° view field around itself in a generally horizontal direction. However, one fourth of the view field (a left-hand half of the rear view field (90°)) of the omniazimuth visual sensor 1010A is blocked by the vehicle 900. That is, the effective view field of the omniazimuth visual sensor 1010A is limited to about 270° front view field. Similarly, one fourth of the view field (a right-hand half of the front view field (90°)) of the omniazimuth visual sensor 1010B is blocked by the vehicle 900. That is, the effective view field of the omniazimuth visual sensor 1010B is limited to about 270° rear view field. Thus, with these two omniazimuth visual sensors 1010A and 1010B, an about 360° view field image of the surroundings of the entire vehicle 900 can be obtained such that the omniazimuth visual sensors 1010A and 1010B can see areas in close proximity to the vehicle 900 which are the blind areas of the vehicle 100 of embodiment 1.

For example, referring to the example illustrated in FIG. 7, consider a case where the driver selects the first perspective image display window 720 and uses the direction key 760 so as to show a bird's-eye image of the vehicle 900. In this case, if image data obtained through the omniazimuth visual sensor 1010A is used without being specifically transformed, the vehicle 900 may not be displayed in the center of the display screen. According to this embodiment, when such occurs, the image data obtained through the omniazimuth visual sensor 1010A can be transformed according to the transformation methods as described in embodiment 1 such that the vehicle 900 is displayed at a predetermined position (e.g., center) of the display screen as shown in, for example, FIG. 10.

Figure 10:
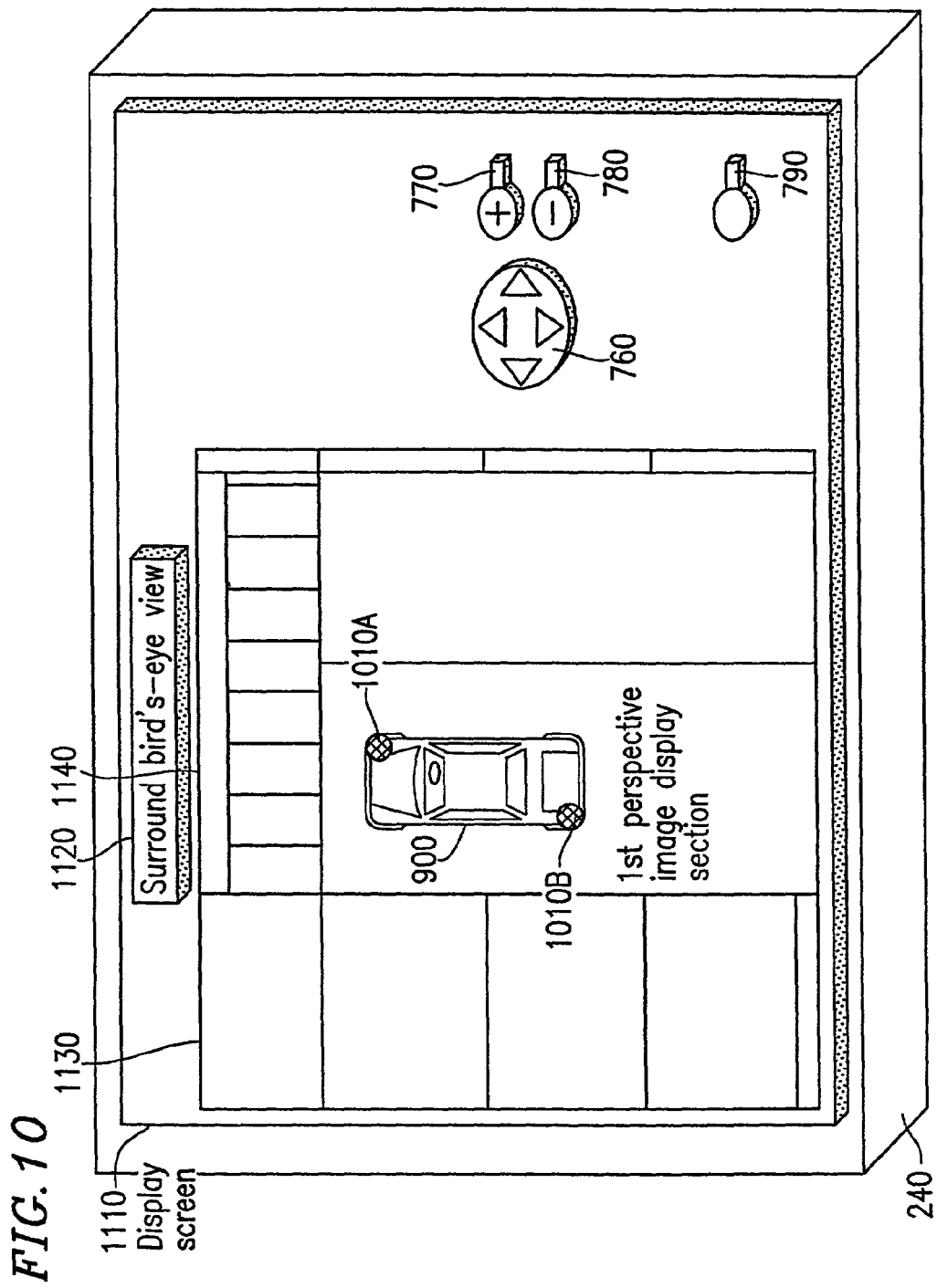
FIG. 10 shows an example of a display screen of a display section in the surround surveillance apparatus according to embodiment 2.

FIG. 10 shows an exemplary display screen 1110 according to embodiment 2. In embodiment 2, the image processor 230 or the display section 240 can combine a bird's-eye image obtained through the omniazimuth visual sensor 1010A located at a front right corner and a bird's-eye image obtained through the omniazimuth visual sensor 1010B located at a left rear corner diagonally to the sensor 1010A so as to display surroundings of the vehicle 900 on the display screen 1110 at one time as shown in FIG. 10.

It should be noted that when an omniazimuth visual sensor is positioned so as to be higher than the main body (or roof) of a vehicle, a bird's-eye image of the vehicle and surroundings thereof which is seen from a position right above the vehicle can be obtained. However, when the omniazimuth visual sensor is positioned so as to be lower than the main body (or roof) of a vehicle, the omniazimuth visual sensor can obtain only an image showing a side face(s) of the vehicle. In such a case, in order to display a bird's-eye image showing the entire vehicle, a top view image of the vehicle and surroundings thereof which was previously captured from a position directly above the vehicle or which was previously created by using computer graphics software is prepared, and this top view image is displayed in a superimposed manner at a predetermined position within a displayed image on the display screen so as to be combined with the image obtained through the omniazimuth visual sensor. With such a display function, the driver of the vehicle can readily check the surroundings of the vehicle. For example, in a parking place, the driver of the vehicle can readily grasp a distance between the vehicle and white lines or obstacles.

Figure 11:
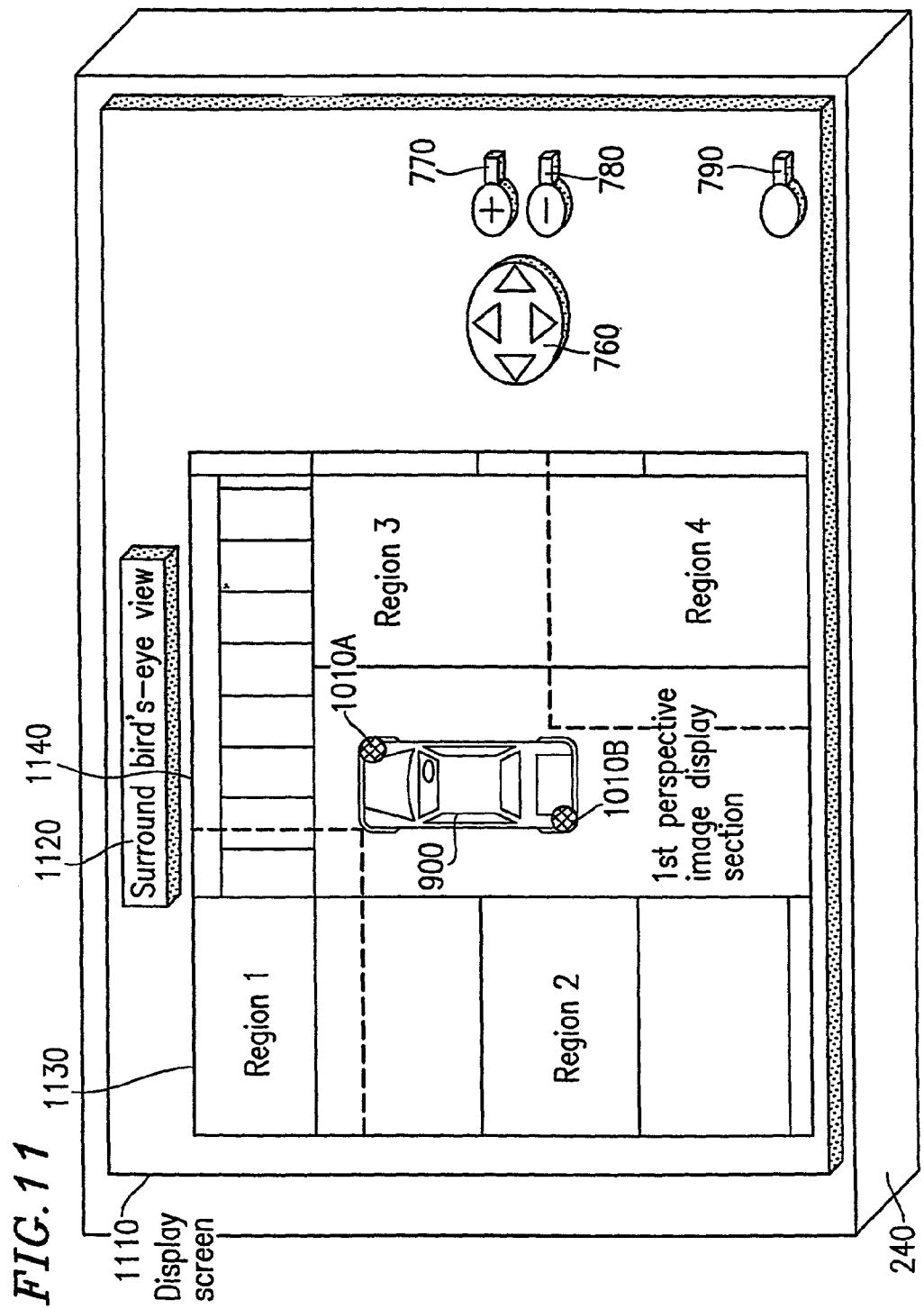
FIG. 11 shows a division of regions on a display screen of a display section in the surround surveillance apparatus according to embodiment 2.

Furthermore, as shown in FIG. 11, when images obtained through the omniazimuth visual sensors 1010A and 1010B which are located at the diagonal corners of the vehicle 900 are combined, the both sensors 1010A and 1010B can obtain images of region 1 and region 4. In such a case, an image of region 1 (or region 4) is displayed by selectively using an image derived from the sensor 1010A and an image derived from the sensor 1010B. However, when such a display method is used, a visual discontinuity is caused at an interface between an image derived from a selected omniazimuth visual sensor and an image derived from the other omniazimuth visual sensor (e.g., interface between region 1 or 4 and region 2 or 3) due to the difference of the viewing angle between the sensors 1010A and 1010B. Such a visual discontinuity causes difficulty and discomfort on the driver of the vehicle 900 in seeing the displayed image.

In order to avoid such a problem, there is provided a switching key 790 on the display screen which is connected to the display control section 250. In response to a switching operation of the driver using the switching key 790, a signal is transmitted to the display control section 250. According to the signal from the switching key 790, one of the sensors 1010A and 1010B is selected for display an image of region 1 or 4 such that an image of a region to which the driver is paying greater attention and an image of a region adjacent to this region are combined so as to provide a smoothly combined display image to the driver. For example, when the driver of the vehicle 900 is paying greater attention to an area between region 1 and region 3 rather than an area between region 1 and region 2, the driver can use the switching key 790 to select an image of region 1 which is obtained through the sensor 1010A such that a displayed image is visually smooth at the interface between region 1 and region 3 whereas a visual discontinuity is caused at the interface between region 1 and region 2. Conversely, when the driver uses the switching key 790 to select an image of region 1 which is obtained through the sensor 1010B such that a displayed image is visually smooth at the interface between region 1 and region 2 whereas a visual discontinuity is caused at the interface between region 1 and region 3.

Embodiment 3

Figure 12A:
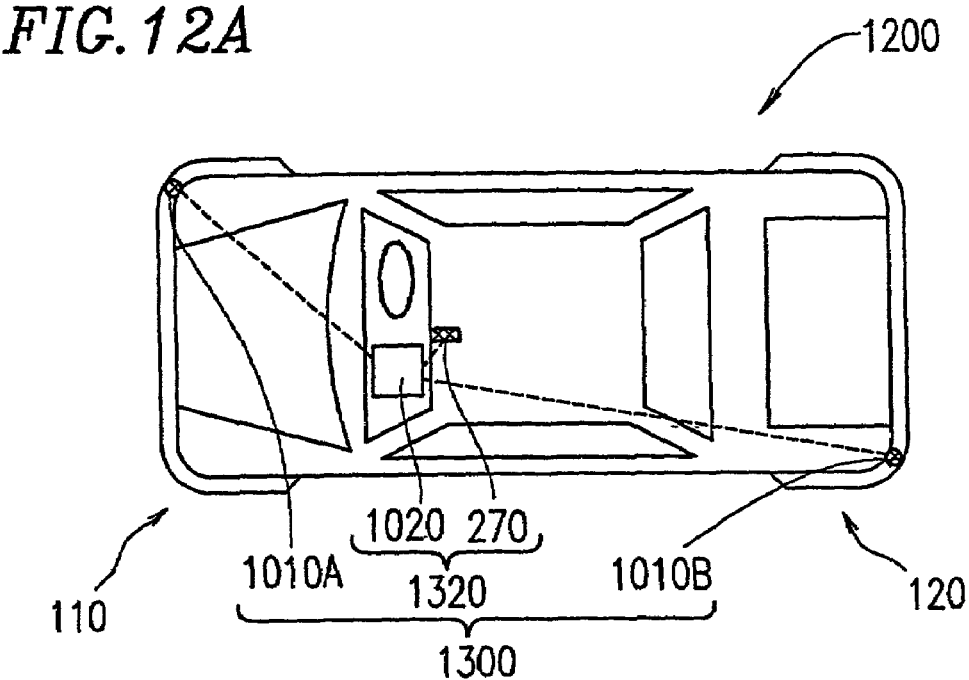
FIG. 12A is a plan view showing a structure of a vehicle incorporating a surround surveillance apparatus according to embodiment 3 of the present invention.
Figure 12B:
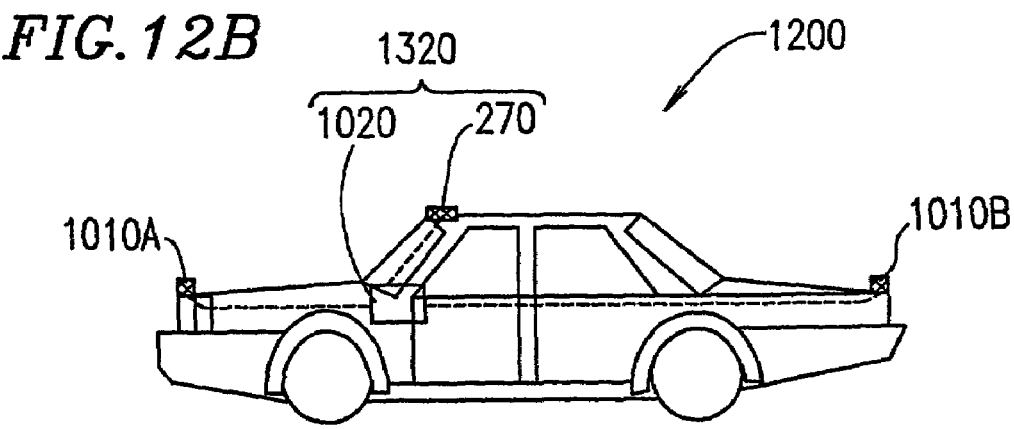
FIG. 12B is a side view showing the vehicle of FIG. 12A.

FIG. 12A is a plan view showing a structure of a vehicle 1200 incorporating a surround surveillance apparatus 1300 according to embodiment 3 of the present invention. FIG. 12B is a side view showing the vehicle of FIG. 12A.

The surround surveillance apparatus 1300 shown in FIGS. 12A and 12B is different from the surround surveillance apparatus 1000 in that a temperature measurement section 270 is provided at a position on the external surface of the vehicle 1200 which is optimum for measuring the environmental temperature (e.g., a frontal portion of the roof).

Figure 13:
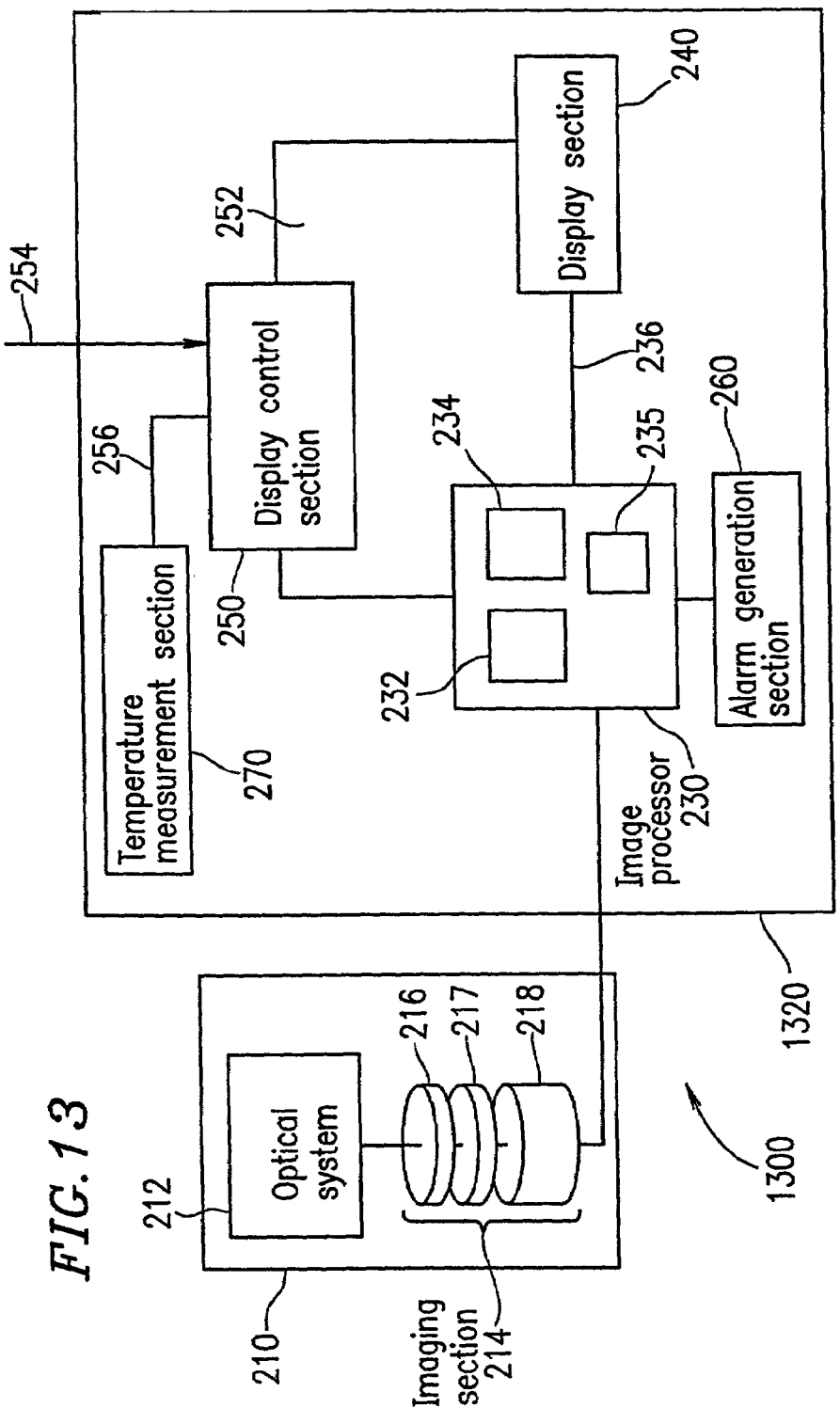
FIG. 13 is a block diagram showing a configuration of the surround surveillance apparatus according to embodiment 3.

FIG. 13 is a block diagram showing a configuration of the surround surveillance apparatus 1300 according to embodiment 3. The surround surveillance apparatus 1300 is different from the surround surveillance apparatus 200 of FIG. 2 in that an arithmetic/control section 1320 of the apparatus 1300 includes the temperature measurement section 270.

In embodiment 3, as mentioned above, the temperature measurement section 270 is provided at a position on the external surface of the vehicle 1200 which is optimum for measuring the environmental temperature (e.g., a frontal portion of the roof). The temperature measurement section 270 is connected to the display control section 250 of the surround surveillance apparatus 1300 via a cable. When an engine of the vehicle 1200 is started, if a measurement result of the temperature measurement section 270 is equal to or lower than a predetermined temperature, the display control section 250 automatically displays, based on an output 256 from the measurement section 270, for a certain period an image showing the surroundings of the vehicle 1200 at one time in a single display screen, for example, like a bird's-eye image shown in FIG. 10. Due to such a structure, even when the environmental temperature of the vehicle 1200 is at or below a predetermined temperature so that the window glass of the vehicle 1200 is fogged and the fogged window inhibits the driver from looking out of the window, the driver can readily check the safety around the vehicle 1200.

In embodiments 1 to 3, the omniazimuth visual sensor is placed on a roof or a bumper of a vehicle, but may also be placed on a hood, a side mirror, or any other place of the vehicle. Furthermore, in embodiments 1 to 3, a passenger car is illustrated as the vehicle. However, the present invention is not limited thereto, but can be applied to a large vehicle, such as a bus or the like, and a vehicle for cargo. In particular, the present invention is useful for cargo vehicle because in many cargo vehicles a driver's view in the rearward direction of the vehicle is blocked by a cargo compartment. The present invention is applicable to trains. Further, the present invention is applicable to airplanes, and general movable robots.

As described hereinabove in detail, according to the present invention, an omniazimuth visual sensor(s) is placed, for example, on a bumper(s), at a corner(s), etc., of a vehicle, whereby a driver's blind areas can be readily observed. With such a system, the driver does not need to switch a plurality of cameras, to select one among these cameras for display on a display device, or to change the orientation of the camera, as in a conventional vehicle surveillance apparatus. Thus, when the driver starts to drive, when the motor vehicle turns right or left, or when the driver parks the motor vehicle in a carport or parking lot or drives the vehicle out of the carport or parking lot, the driver can check the safety around the vehicle and achieve safe driving.

Furthermore, the driver can select a desired display image and change the display direction or the image size. In particular, by switching a display to a bird's-eye view display when the driver parks the vehicle in a carport or parking lot or drives the vehicle out of the carport or parking lot, or when the driver parks or stops the vehicle as close to the edge of the adjacent vehicles or obstacles as possible, the safety around the vehicle can be readily checked (for example, the distance between his/her own vehicle and adjacent vehicles or obstacles can be readily checked), whereby a contact accident(s) or the like can be prevented.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A surround surveillance system mounted on a mobile body for surveying surroundings around the mobile body, comprising an omniazimuth visual system, the omniazimuth visual system including:
    at least one omniazimuth visual sensor including an optical system capable of obtaining an image with an omniazimuth view field area therearound and capable of central projection transformation of the image into an optical image, and an imaging section including an imaging lens for converting the optical image obtained by the optical system into image data;
    an image processor for transforming the image data into at least one of panoramic image data and perspective image data;
    a display section for displaying one of a panoramic image corresponding to the panoramic image data and a perspective image which is panned or tilted corresponding to the perspective image data; and
    a display control section for controlling the display section;
    wherein the optical system includes a hyperboloidal mirror which has a shape of one sheet of a two-sheeted hyperboloid, an optical axis of the hyperboloidal mirror being identical with an optical axis of the imaging lens, and the principal point of the imaging lens being located at one of focal points of the hyperboloidal mirror, and
    wherein the at least one omniazimuth visual sensor is stationary with respect to the mobile body, such that the perspective image, which is panned or tilted corresponding to the perspective image data, is obtained by transforming the image data obtained from the optical image taken by the at least one omniazimuth visual sensor.

2. A surround surveillance system according to claim 1, wherein the at least one omniazimuth visual sensor is located such that a bird's-eye image of the mobile body and surroundings thereof is transformed into the image data.

3. A surround surveillance system according to claim 1, wherein the display section simultaneously or selectively displays the panoramic image and the perspective image.

4. A surround surveillance system according to claim 1, wherein the display section displays an image seen in a direction opposite to a moving direction of the mobile body.

5. A surround surveillance system according to claim 1, wherein the image processor transforms image data corresponding to a first area within the omniazimuth view field area around the optical system into first perspective image data.

6. A surround surveillance system according to claim 5, wherein in response to control by the display control section, the image processor transforms image data corresponding to a second area within the omniazimuth view field area around the optical system which does not overlap with the first area into a second perspective image data which does not coincide with the first perspective image data.

7. A surround surveillance system according to claim 6, wherein the second area is identical to an area which is obtained by performing a least one of translational transfer processing and zoom-in/zoom-out processing on the first area.

8. A surround surveillance system according to claim 1, wherein the optical system is positioned such that an optical axis of the optical system is perpendicular to a moving direction of the mobile body.

9. A surround surveillance system according to claim 1, wherein in response to control by the display control section, the display section displays an image showing the mobile body on a display screen of the display section such that the mobile body is shown at a predetermined position on a displayed image on the display screen.

10. A surround surveillance system according to claim 1, wherein the display section simultaneously displays an image seen in a direction opposite to a moving direction of the mobile body and an image seen in a direction which is not identical or opposite to the moving direction of the mobile body.

11. A surround surveillance system according to claim 1, wherein the mobile body is a vehicle.

12. A surround surveillance system according to claim 11, wherein:
    the vehicle includes a first bumper provided at a moving direction side of the vehicle and a second bumper provided at a side of or the vehicle opposite to the moving direction side; and
    the at least one omniazimuth visual sensor includes a first omniazimuth visual sensor placed on the first bumper and a second omniazimuth visual sensor placed on the second bumper.

13. A surround surveillance system according to claim 12, wherein:

the first omniazimuth visual sensor is placed on one of a right end and a left end of the first bumper with respect to the moving direction of the vehicle; and the second omniazimuth visual sensor is placed on one end of the second bumper which is diagonal to the end of the first bumper where the first omniazimuth visual sensor is placed with respect to a body of the vehicle.

14. A surround surveillance system according to claim 13, wherein the display section displays an image obtained by combining a first perspective image derived from the first omniazimuth visual sensor and a second perspective image derived from the second omniazimuth visual sensor.

15. A surround surveillance system according to claim 1, wherein:

the image processor includes a storage section for storing mobile body image data;

the image processor combines the mobile body image data from the storage section with the perspective image data derived from the optical system; and the display section displays based on the combined image data a perspective image including the image showing the mobile body.

16. A surround surveillance system according to claim 15, wherein the mobile body image data is image data created by using computer graphics software.

17. A surround surveillance system according to claim 15, wherein the mobile body image data is image data obtained by capturing an image of the mobile body.

18. A surround surveillance system according to claim 1, wherein:

the omniazimuth visual system further includes a temperature measurement section for measuring an environmental temperature of the mobile body;

when the environmental temperature measured by the temperature measurement section is equal to or lower than a predetermined temperature, the display section displays a perspective bird's-eye image of the mobile body and surroundings thereof after the mobile body becomes movable.

19. A surround surveillance system according to claim 13, wherein, when the display section displays a perspective image of an overlapping region between a display region of a perspective bird's-eye image of the mobile body and surroundings thereof which is obtained through the first omniazimuth visual sensor and a display region of a perspective bird's-eye image of the mobile body and surroundings thereof which is obtained through the second omniazimuth visual sensor, the display section displays based on control by the display control section a perspective image derived from one of the first omniazimuth visual sensor and the second omniazimuth visual sensor.

* * * * *